(12) United States Patent
Inoue et al.

(10) Patent No.: US 6,675,141 B1
(45) Date of Patent: Jan. 6, 2004

(54) APPARATUS FOR CONVERTING REPRODUCING SPEED AND METHOD OF CONVERTING REPRODUCING SPEED

(75) Inventors: Akira Inoue, Tokyo (JP); Masayuki Nishiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 596 days.

(21) Appl. No.: 09/696,683

(22) Filed: Oct. 26, 2000

(30) Foreign Application Priority Data

Oct. 26, 1999 (JP) ......................................... P11-304624

(51) Int. Cl.[7] ............................................. G10L 11/04
(52) U.S. Cl. ....................... 704/207; 704/201; 704/278; 704/209; 704/205; 381/97; 381/98; 381/101; 381/103; 84/622; 84/626; 84/627
(58) Field of Search ................................ 704/500–504, 704/207, 209, 201, 224, 278, 218, 219, 203, 265, 205; 381/98, 97, 101, 103, 17; 84/622, 626, 627, 659

(56) References Cited

U.S. PATENT DOCUMENTS

| | | | | |
|---|---|---|---|---|
| 4,672,667 A | * | 6/1987 | Scott et al. ................... | 704/231 |
| 4,776,014 A | | 10/1988 | Zinser, Jr. ....................... | 381/38 |
| 4,852,169 A | * | 7/1989 | Veeneman et al. ........... | 704/207 |
| 5,054,085 A | * | 10/1991 | Meisel et al. ................. | 704/207 |
| 5,422,977 A | * | 6/1995 | Patterson et al. ............. | 704/276 |
| 5,479,564 A | * | 12/1995 | Vogten et al. ................. | 704/267 |
| 5,744,741 A | * | 4/1998 | Nakajima et al. ............. | 84/622 |
| 5,903,866 A | * | 5/1999 | Shoham ........................ | 704/265 |
| 5,924,061 A | * | 7/1999 | Shoham ........................ | 704/218 |
| 5,933,808 A | * | 8/1999 | Kang et al. .................. | 704/278 |
| 6,115,685 A | * | 9/2000 | Inoue et al. .................. | 704/205 |

FOREIGN PATENT DOCUMENTS

EP 0883106 10/1997 ............. G10L/3/02

OTHER PUBLICATIONS

Bae, MyungJin and Jo, WangRae, *On a Fast Pitch Search of CELP Type Vocoder using Decimation Technique*, IEE TENCON–Digital Signal Processing Applications, pp. 204–208, 1996.

Chen, Juin–Hwey, Toll–Quality 16 KB/S Celp Speech Coding With Very Low Complexity, Speech Coding Research Department, AT&T Bell Laboratories, Murray Hill, New Jersey, USA, pp. 9–12.

* cited by examiner

*Primary Examiner*—Vijay Chawan
(74) *Attorney, Agent, or Firm*—Jay H. Maioli

(57) ABSTRACT

A method and apparatus for converting the reproducing speed of an acoustic signal where, of the acoustic signals held in a data recording section 1, the input acoustic signal $s1$ (sampled for max. pitch cycle×2) is read from a process-start position P. A low-pass filter 7 controls the high-band component of the acoustic signal $s1$. A decimation section 8 performs appropriate down-sampling on a signal output from the low pass filter 7. The signal, thus down-sampled, is read into a signal buffer section 9. A down-sampled, input acoustic signal $s2$ is transferred from the signal buffer section 9 to a pitch-calculating section 3, which calculates a pitch cycle $s3$.

14 Claims, 28 Drawing Sheets

APPARATUS FOR CONVERTING REPRODUCING SPEED AND METHOD OF CONVERTING REPRODUCING SPEED

BACKGROUND OF THE INVENTION

The present invention relates to an apparatus and method which convert the acoustic-signal reproducing speed by processing a small amount of data.

Various techniques of converting the speed of reproducing digital PCM acoustic signals from a given recording medium are known. Of these techniques, a method such as redundant addition wherein the motion of a pointer is controlled, PICOLA (Pointer Interval Controlled Over Lap and Add) is generally utilized.

A reproducing-speed converting apparatus will be described, which generates R-fold acoustic signals from source acoustic signals by means of redundant addition achieved by controlling the motion of a pointer (PICOLA system). R is a constant that represents the rate of converting the reproducing speed. R is greater than one (R>1) in the case of high-speed reproduction of acoustic signals. R is equal to or less than one in the case of low-speed reproduction of acoustic signals. FIG. 1 is a block diagram showing the reproducing-speed converting apparatus.

The reproducing-speed converting apparatus comprises a data-recording section 1, an input buffer section 2, a pitch-calculating section 3, a process control section 4, a data-operating section 5, and a data-accumulating section 6. The data-recording section 1 records acoustic signals and holds the same. The input buffer section 2 receives an input acoustic signal s1 from the data-recording section 1. The signal s1 (sampled for max. pitch cycle×2) has been generated from a process-start position P. The input buffer section 2 transfers an acoustic signal s2 for finding a pitch, to the pitch-calculating section 3. The pitch-calculating section 3 calculates a pitch cycle s3, which is supplied to the process control 4. Under the control of the process control section 4, the input buffer section 2 transfers a signal s4, to the data-operating section 5. The data-operating section 5 performs a prescribed process on the signal s4 to achieve high-speed reproduction or low-speed reproduction, thereby generating an operation process signal s5. The signal s5 is supplied via the input buffer section 2 to the data-accumulating section 6. In the meantime, the process control section 4 supplies a process control signal s6 to the input buffer section 2. Further, the process control section 4 supplies a data-read control signal s7 to the data-recording section 1.

How the conventional reproducing-speed converting apparatus, which is a PICOLA system, accomplishes high-speed reproduction and how-speed reproduction will be described below.

The high-speed reproduction will be first explained, with reference to FIGS. 2 to 4. First, of the acoustic signals held in the data-recording section 1, an input acoustic signal s1 (sampled for max. pitch cycle×2) is read from the process-start position P shown in FIG. 2, into the input buffer section 2. The signal s1 is transferred from the section 2 to the pitch-calculating section 3.

The pitch-calculating section 3 calculates a pitch cycle s3. More specifically, the section 3 generates a pitch cycle s3 (T0) that mininimizes the mean distortion d (T) defined by the following equation (1):

(Equation 1)

$$d(T) = \frac{1}{T}\sum_{i=0}^{T-1} \{x(i) - x(i+T)\}^2, \quad T_{\min} \leq T \leq T_{\max} \quad (1)$$

The input buffer 2 transfers an acoustic signal, or a signal s4, to the data-operating section 5. The signal s4 is based on the pitch cycle s3 (T0) the pitch-calculating section 3 has calculated in accordance with the equation (1). The signal s4 lasts for 2 pitch cycles from the process-start position P.

The acoustic signal s4 lasting for 2 pitch cycles (2×T0), read into the data-operating section 5, is subjected to weight-adding process that is performed in accordance with the weight-window data shown in FIG. 3. The section 5 generates a weight-added signal, or an operation process signal a5 that lasts for 1 pitch cycle (T0 sample).

Then, the process control section 4 calculates a length L of a reproduced signal (T0 sample), in accordance with the rate R (R>1) of converting the reproducing speed. The length L is defined by the following equation (2):

(Equation 2)

$$L = T_0 \times \frac{1}{R-1} \quad (2)$$

The reproduction-signal length L calculated in accordance with the equation (2) may be longer than the pitch cycle T0 (1<R<2). In this case, the acoustic signal (i.e., operation process signal s5) generated by the data-operating section 5 and lasting for one pitch cycle (i.e., T0 sample) is transferred to the data-accumulating section 6. Moreover, other input acoustic signals are transferred from the input buffer section 2 to the data-accumulating section 6, so that all samples transferred to the data-accumulating section 6 defined the reproduction-signal length L.

The length defined by the input acoustic signals read into the input buffer section 2 may be shorter than the reproduction-signal length L. If so, other acoustic signals are read from the data-recording section 1 into the input buffer section 2 in accordance with a data-read control signal s7 supplied from the process control section 4. These signals, which are required to make the length equal to the reproducing-signal length L, are directly transferred to the data-accumulating section The reproducing-signal length L may be shorter than the pitch cycle T0 (R>2) as is illustrated in FIG. 4. In this case, the acoustic signals, which are L samples included in T0 samples that define one pitch cycle calculated by the data-operating section 5, are transferred to the data-accumulating section 6.

The next process-start position P' in the data-recording section 1 is updated in accordance with the following equation (3):
(Equation 3)

$$P' = P + T_0 \times \frac{R}{R-1} \quad (3)$$

The low-speed reproduction will be now explained, with reference to FIGS. 5 to 7. First, of the acoustic signals held in the data-recording section 1, an input acoustic signal s1 (sampled for max. pitch cycle×2) is read from the process-start position P shown in FIG. 5, into the input buffer section 2. The signal s1 is transferred from the section 2 to the pitch-calculating section 3. The pitch-calculating section 3 calculates a pitch cycle s3.

The input buffer 2 transfers an acoustic signal, or a signal s4, to the data-operating section 5. The signal s4 is based on the pitch cycle s3 (T0) the pitch-calculating section 3 has calculated. The signal s4 lasts for 2 pitch cycles from the process-start position P.

The acoustic signal s4 lasting for 2 pitch cycles, read into the data-operating section 5, is subjected to weight-adding process that is performed in accordance with the weight-window data shown in FIG. 6. The section 5 generates a weight-added signal, or an operation process signal a5 that lasts for 1 pitch cycle (T0 sample).

Next, the process control section 4 calculates a length L of a reproduced signal [sample], in accordance with the rate R (0<R<1) of converting the reproducing speed. The length L is defined by the following equation (4):
(Equation 4)

$$L = T_0 \times \frac{1}{1-R} \quad (4)$$

The reproduced-signal length L calculated in accordance with the equation (2) may be longer than two pitch cycles (2×T0) and, hence (0.5<R<1). If so, the acoustic signal for one pitch cycle (T0 sample) from the first signal held in the input buffer section 2 is transferred to the data-accumulating section 6, along with the acoustic signal (i.e., operation process signal s5) generated by the data-operating section 5 and lasting for one pitch cycle (i.e., T0 sample). Moreover, other input acoustic signals are transferred from the input buffer section 2 to the data-accumulating section 6, so that all samples transferred to the data-accumulating section 6 define the reproduced-signal length L.

The length defined by the input acoustic signals read into the input buffer section 2 may be shorter than the reproduced-signal length L. Then, other acoustic signals are read from the data-recording section 1 into the input buffer section 2 in accordance with a data-read control signal s7 supplied from the process control circuit 4. These signals, which are required to make the length equal to the reproduced-signal length L, are directly transferred to the data-accumulating section 6.

The reproduce-signal length L may be shorter than two pitch cycles (2×T0) (that is, R>0.5) as shown in FIG. 7. In this case, the acoustic signals, which are L-T0 samples included in T0 samples that define one pitch cycle calculated by the data-operating section 5 and lasts from the first signal held in the input buffer section 2, are transferred to the data-accunulating section 6.

The next process-start position P' in the data-recording section 1 is updated in accordance with the following equation (5):
(Equation 5)

$$P' = P + T_0 \times \frac{R}{1-R} \quad (5)$$

The greater part of the calculation performed in the conventional PICOLA system described above is the calculation of pitches in the pitch-calculating section 3. A pitch that would minimize the mean distortion defined by the following equation (1) is searched for by means of the pitch-calculating section 3. The number of samples per unit time of the acoustic signals is increased in the higher sampling frequency. Thus, the pitch cycle for searching is increased.

FIG. 8 represents the relation between the sampling frequency and the averaged processing power (i.e., ratio of processing time to the duration of sound reproduced). As seen from FIG. 8, the amount of data that should be processed to calculate pitch cycles in the conventional PICOLA system is about a square of the sampling frequency.

BRIEF SUMMARY OF THE INVENTION

The present invention has been made in view of the foregoing. The object of the invention is to provide an apparatus and method that convert the speed of reproducing acoustic signals sampled at such a high frequency as 48000 Hz or 44100 Hz, with a smaller amount of data processing compared with the conventional apparatus and method.

To attain the object, an apparatus for converting an acoustic-signal reproducing speed, according to the invention, comprises: recording means for recording and holding acoustic signals; decimation means for performing decimation process on the acoustic signals recorded in the recording means; first accumulating means for accumulating acoustic signals down-sampled by the decimation means; pitch-calculating means for calculating a pitch cycle of the signals accumulated in the first accumulating means; second accumulating means for accumulating the acoustic signals recorded in the recording means; operation means for calculating a similar waveform from a waveform of the pitch cycle calculated by the pitch-calculating means; third accumulating means for accumulating data representing the similar waveform calculated by the operation means; and control means for controlling the reading of data into the second accumulating means, the calculation performed in the operation means, and the transfer of data to the third accumulating means.

A method of converting an acoustic-signal reproducing speed, according to the invention, comprises: a decimation step of performing decimation process on acoustic signals recorded in recording means; a first input-output step of inputting and outputting acoustic signals down-sampled in the decimation step, into and from a first accumulating means; a pitch-calculating step of calculating a pitch cycle of the signals accumulated in the first accumulating means; a second input-output step of inputting and outputting the acoustic signals recorded in the recording means, into and from a second accumulating means; an operation step of calculating a similar waveform from a pitch waveform of the pitch cycle calculated in the pitch-calculating step; and a third input-output step of inputting and outputting data representing the similar waveform calculated in the pitch-calculating step, into and from a third accumulating means.

An apparatus for converting an acoustic-signal reproducing speed, according to this invention, comprises: recording means for recording and holding acoustic signals; decimation means for performing decimation process on the acoustic signals recorded in the recording means; first accumulating means for accumulating, in units of frames, acoustic signals down-sampled by the decimation means; pitch-calculating means for calculating a pitch cycle of the signals accumulated in the first accumulating means; second accumulating means for accumulating, in units of frames, the acoustic signals recorded in the recording means; operation means for calculating a similar waveform from a waveform of the pitch cycle calculated by the pitch-calculating means; third accumulating means for accumulating, in units of frames, data representing the similar waveform calculated by the operation means; and data-position designating means for controlling a position in the second accumulating means, to which acoustic signals are read, a position in the second accumulating means, at which the calculation of the pitch is started, a position in the third accumulating means, to which data is transferred, and a position in the third accumulating means, at which data is recorded.

A method of converting an acoustic-signal reproducing speed, according to the invention, comprises: a decimation step of performing decimation process on acoustic signals recorded in recording means; a first input-output step of inputting and outputting, in units of frames, acoustic signals down-sampled in the decimation step, into and from a first accumulating means; a pitch-calculating step of calculating a pitch cycle of the signals accumulated in the first accumulating means; a second input-output step of inputting and outputting, in units of frames, the acoustic signals recorded in the recording means, into and from a second accumulating means; an operation step of calculating a similar waveform from a pitch waveform of the pitch cycle calculated in the pitch-calculating step; and a third input-output step of inputting and outputting, in units of frames, data representing the similar waveform calculated in the pitch-calculating step, into and from a third accumulating means.

With the present invention it is possible to reduce the amount of data that should be processed to convert the speed of reproducing acoustic signals that have been sampled at such a high frequency as 48000 Hz or 44100 Hz.

DETAILED DESCRIPTION OF THE INVENTION

Embodiments of the present invention will be described, with reference to the accompanying drawings.

Figure 1:
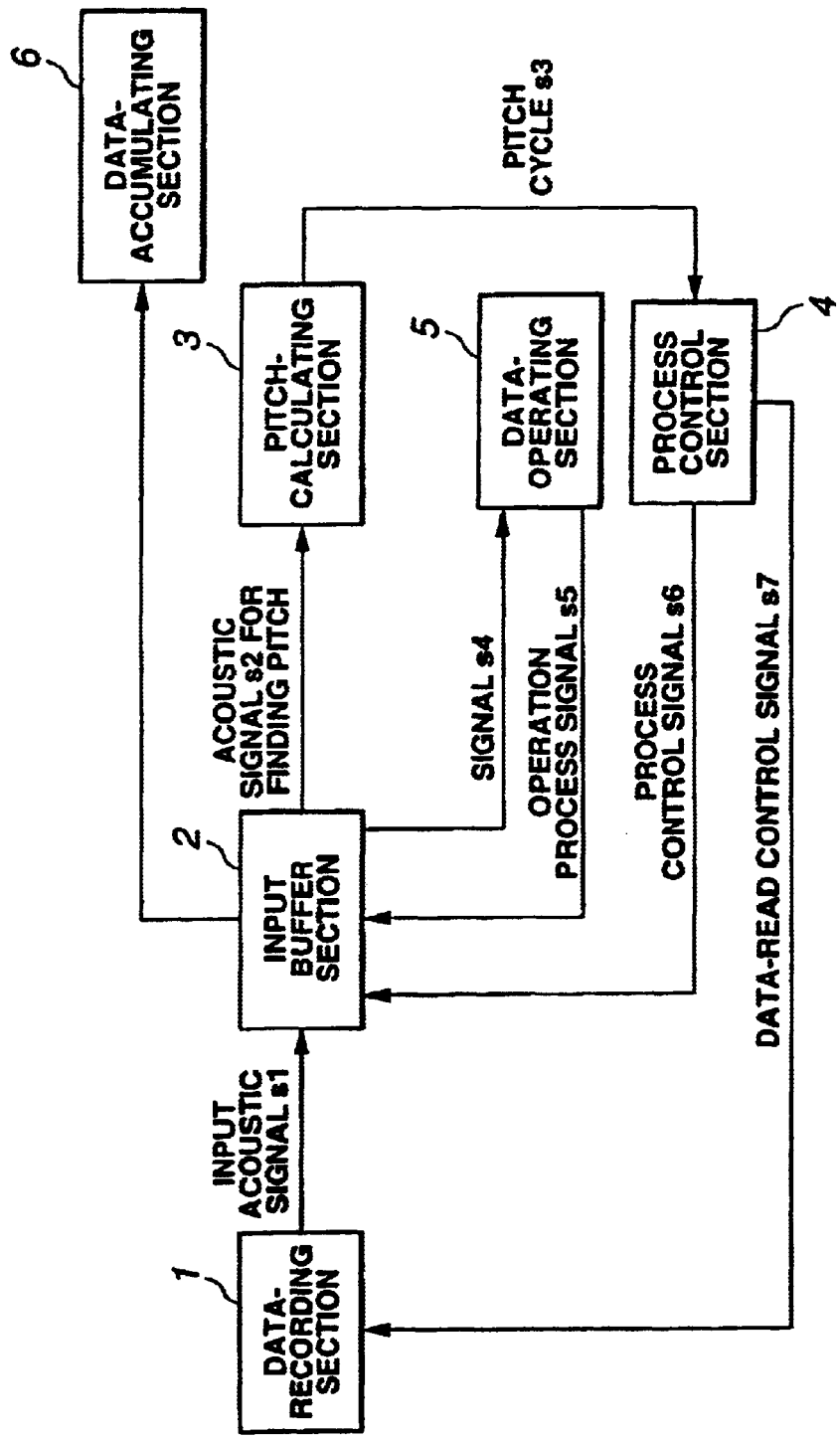
FIG. 1 is a block diagram showing a conventional reproducing-speed converting apparatus that is a PICOLA system.
Figure 2:
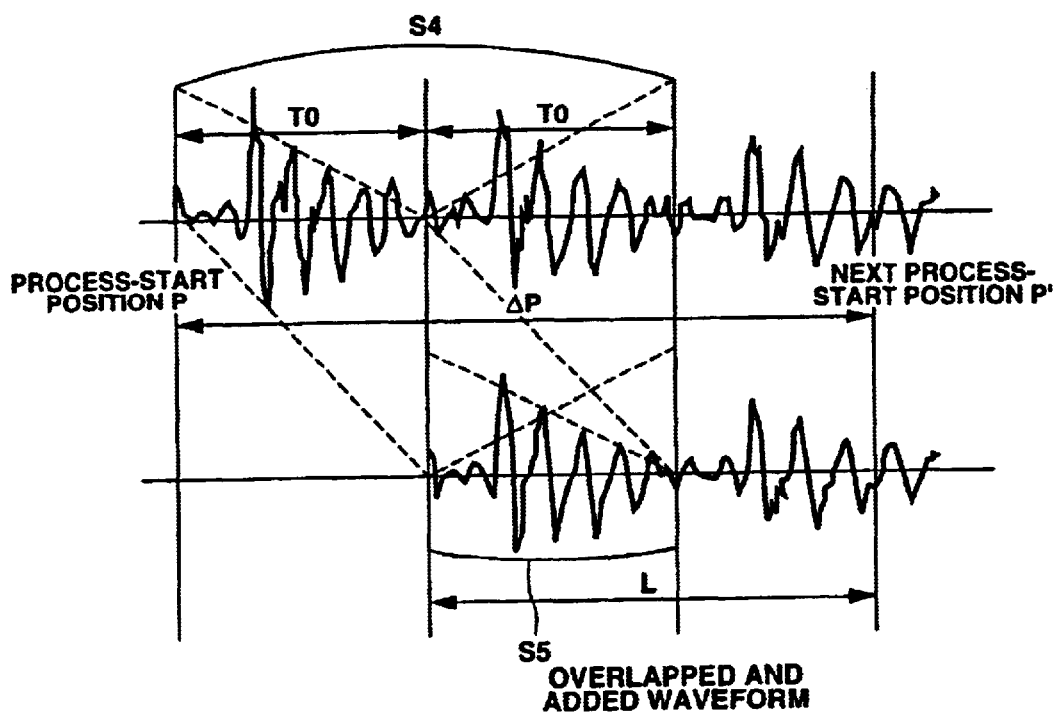
FIG. 2 is a diagram explaining the waveform-overlapping process that is performed in the PICOLA system (during the high-speed reproduction: 1<R<2)
Figure 3:
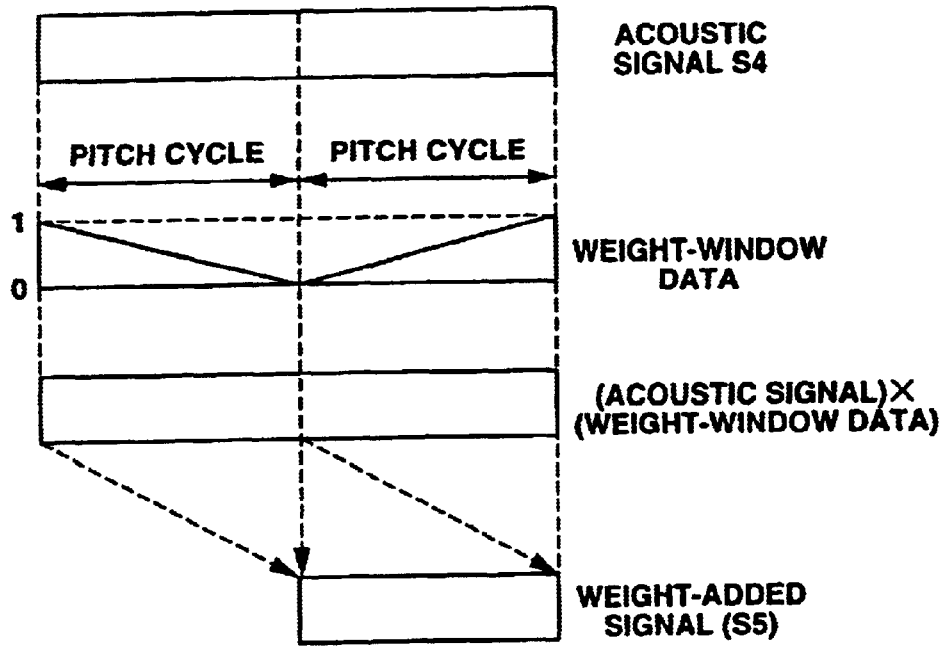
FIG. 3 is a diagram explaining the weight-adding process effected in the PICOLA system (during the high-speed reproduction)
Figure 4:
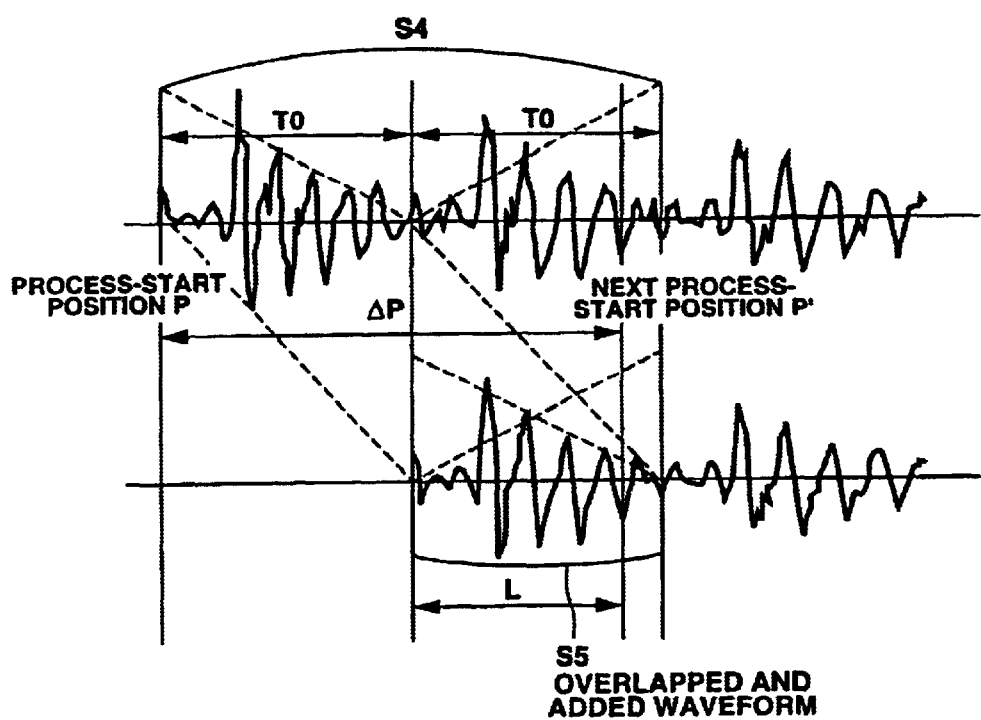
FIG. 4 is a diagram explaining the waveform-overlapping process carried out in the PICOLA system (during the high-speed reproduction: R>2)
Figure 5:
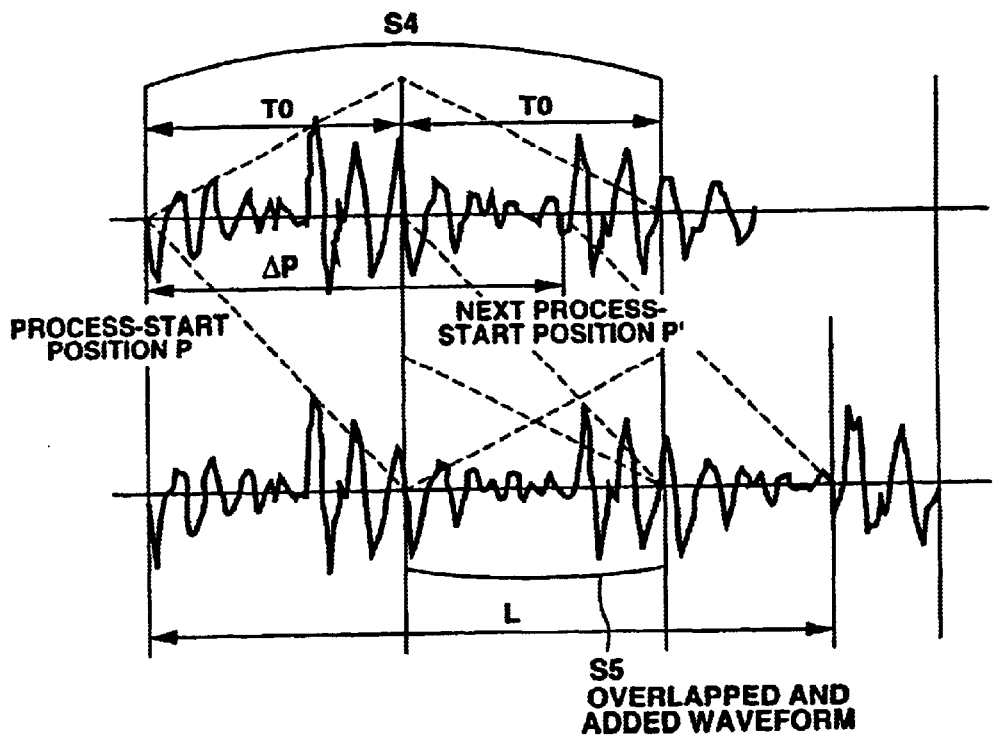
FIG. 5 is a diagram explaining the waveform-overlapping process carried out in the PICOLA system (during the low-speed reproduction: 0.5<R<1)
Figure 6:
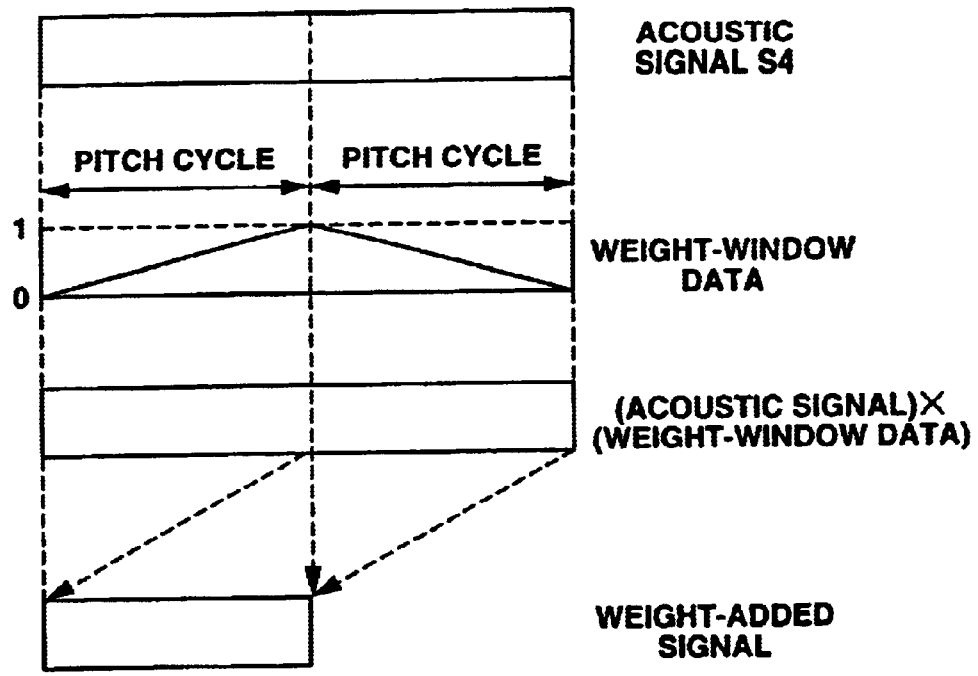
FIG. 6 is a diagram explaining the weight-adding process performed the PICOLA system (during the low-speed reproduction)
Figure 7:
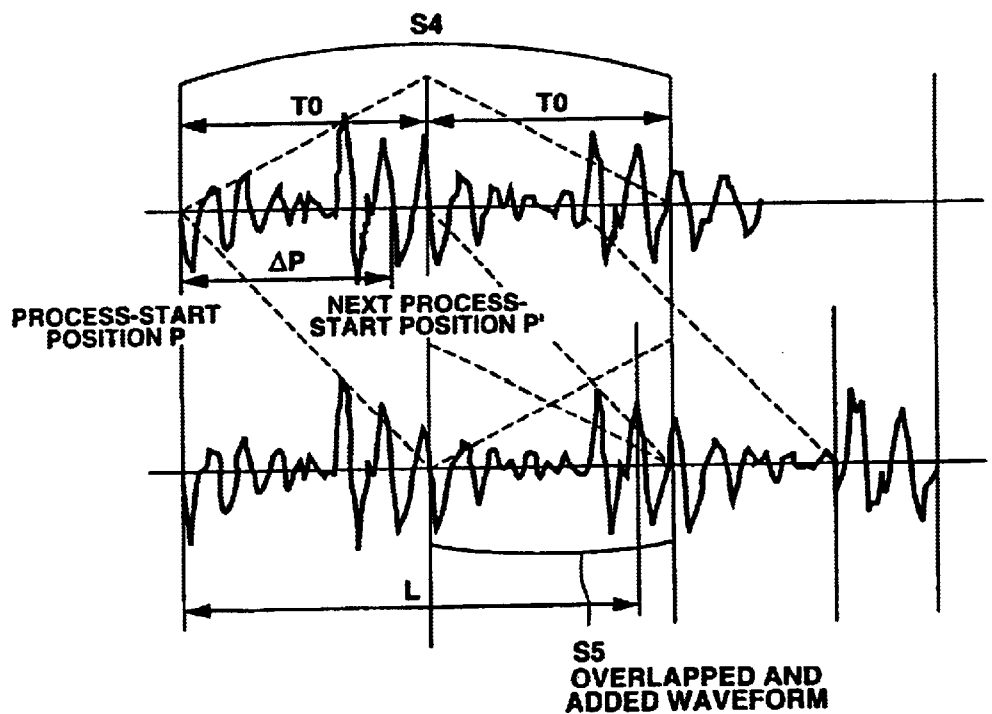
FIG. 7 is a diagram explaining the waveform-overlapping process carried out in the PICOLA system (during the low-speed reproduction: R<0.5)
Figure 8:
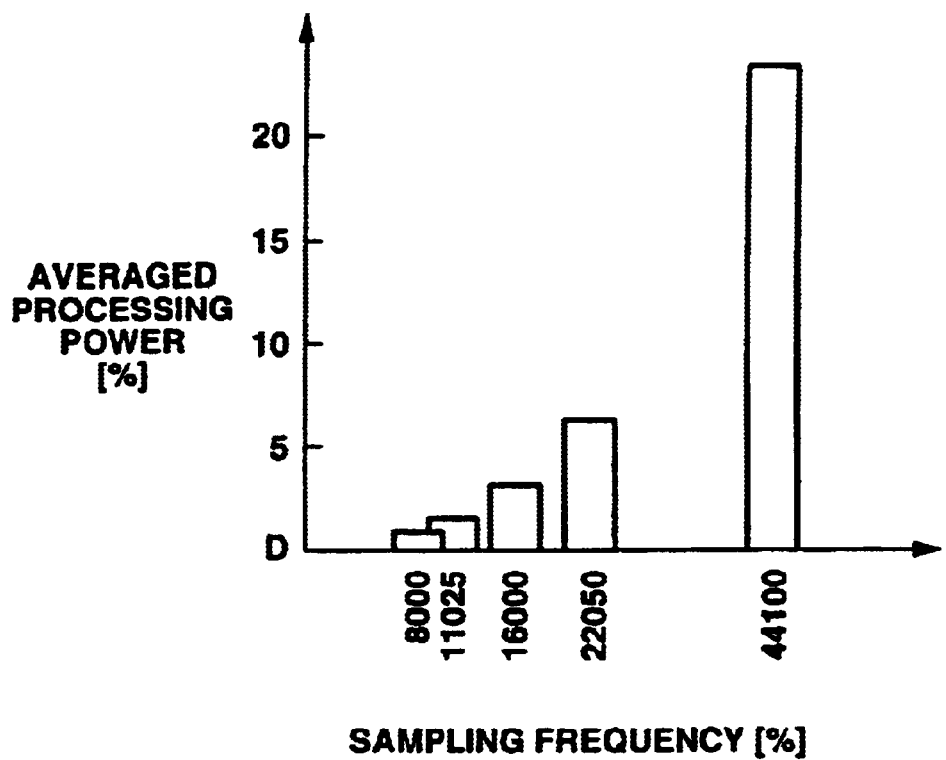
FIG. 8 is a graph representing the relation between the sampling frequency and the amount of data processed, which is observed during the reproducing-speed converting process effected in the PICOLA system.
Figure 9:
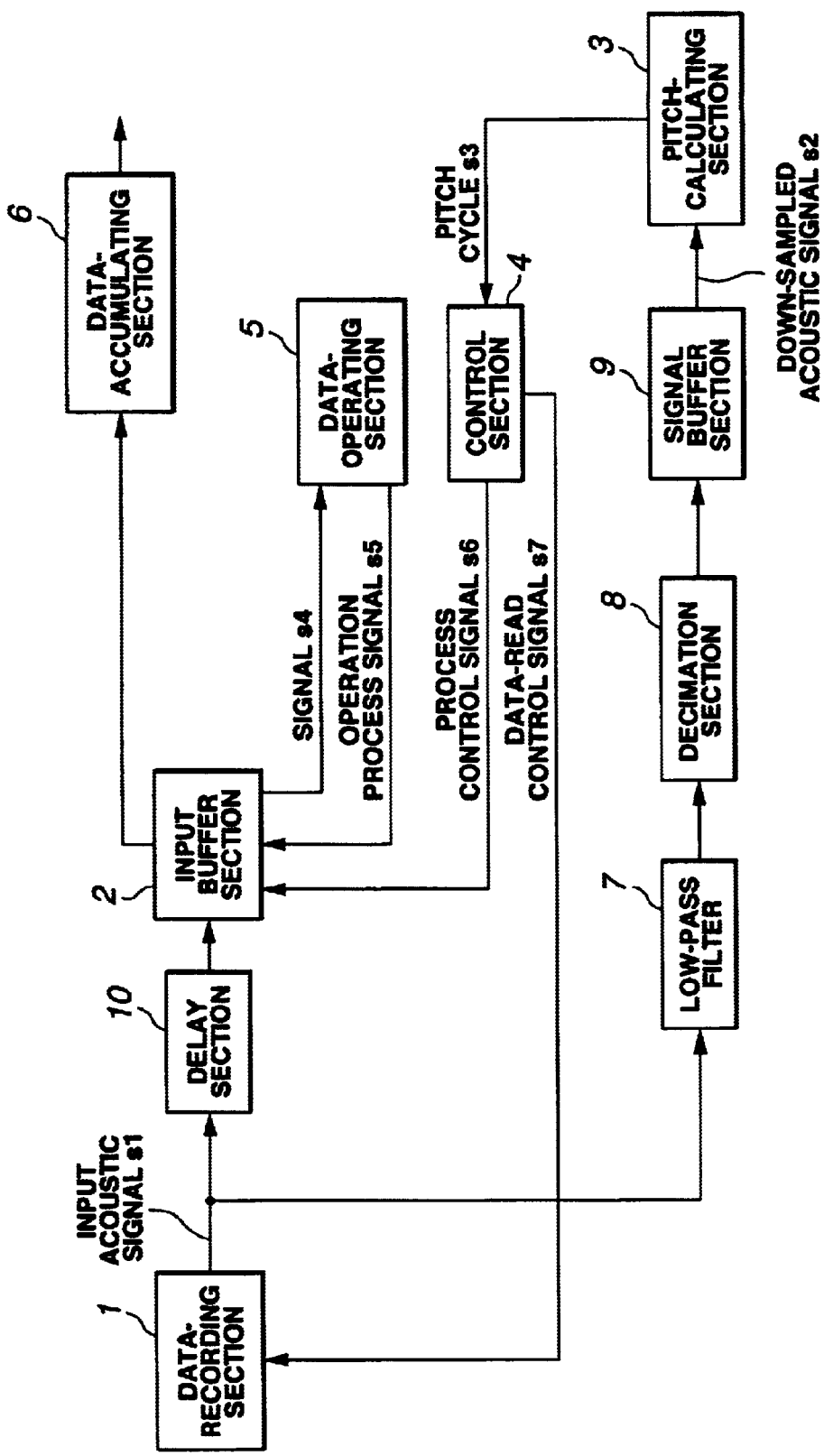
FIG. 9 is a block diagram of a reproducing-speed converting apparatus that is the first embodiment of the present invention.

The first embodiment is a reproducing-speed converting apparatus which converts the reproducing-speed of a digital PCM acoustic signals. As shown in FIG. 9, the reproducing-speed converting apparatus comprises a data-recording section 1, a pitch-calculating section 3, a low pass filter 7, an decimation section 8, and a signal buffer section 9. The data-recording section 1 records and holds acoustic signals. The low pass filter 7 suppress the high-band component of each acoustic signal held in the data-recording section 1. The decimation section 8 performs an appropriate decimation process on the output signal from the low pass filter 7. The signal buffer section 9 accumulates the acoustic signals down-sampled by the decimation section 8. The pitch-calculating section 3 calculates the pitch cycle of the signals accumulated in the signal buffer section 9.

The reproducing-speed converting apparatus comprises further comprises an input buffer section 2, a process control circuit 4, a data-operating section 5, a data-accumulating section 6, and a delay section 10. The delay section 10 compensates for the delay the low pass filter 7 applies to the acoustic signals recorded in the data-recording section 1. The input buffer section 2 accumulates the acoustic signals output from the delay section 10. The data-operating section 5 calculates similar waveforms from the waveforms that have the pitch cycle the pitch-calculating section 3. The data-accumulating section 6 accumulates the data supplied from the data-operating section 5 via the input buffer section 2. The process control circuit 4 controls the data-reading from the data-operating section 5 to the input buffer section 2, the operation of the data-operating section 5, the transfer of the similar waveforms from the section 5 to the data-accumulating section 6.

The operation of the reproducing-speed converting apparatus, i.e., the first embodiment of the invention, will be described in brief.

Of the acoustic signals held in the data-recording section 1, the input acoustic signal s1 (sampled for max. pitch cycle×2) is read from the process-start position P. The low pass filter 7 suppress the high-band component of the acoustic signal s1. The decimation section 8 performs down-sampling on the signal output from the low pass filter 7. The signal, thus down-sampled, is read into the signal buffer section 9.

The output of the signal buffer section 9, or a down-sampled, input acoustic signal s2, is transferred to the pitch-calculating section 3. The section 3 calculates a pitch cycle s3. The pitch cycle s3 is supplied to the process control circuit 4.

The process control circuit 4 generates a data-read control signal s7 from the pitch cycle s3 supplied from the pitch-calculating section 3. The acoustic signals for two pitch cycles from the process-start position P, included in the acoustic signals held in the data-recording section 1, are read into the input buffer section 2 through the delay section 10 that compensates for the delay the low pass filter 7 applies to the acoustic signals.

The process control circuit 4 controls the input buffer section 2 in accordance with the pitch cycle s3 supplied from the pitch-calculating section 3. Thus controlled, the input buffer section 2 transfers the input acoustic signal s1 (i.e., signal s4 to be processed) delayed by the delay section 10, to the data-operating section 5.

The data-operating section 5 calculates a similar waveform from the waveform of the signal s4. The similar waveform, thus obtained, is transferred to the input buffer section 2 of a operating-process signal s5.

The process control circuit 4 calculates the next process-start position P' and the reproduced signal length from the reproducing-speed converting rate and the decimation ratio of the decimation section 8. In accordance with the next process-start position P' and the reproduced signal length, thus calculated, a operating-process signal s5 is transferred to the data-accumulating section 6 through the input buffer section 2. Alternatively, the acoustic signals read from the data-recording section 1 into the input buffer section 2 are transferred to the data-accumulating section 6.

Figure 11:
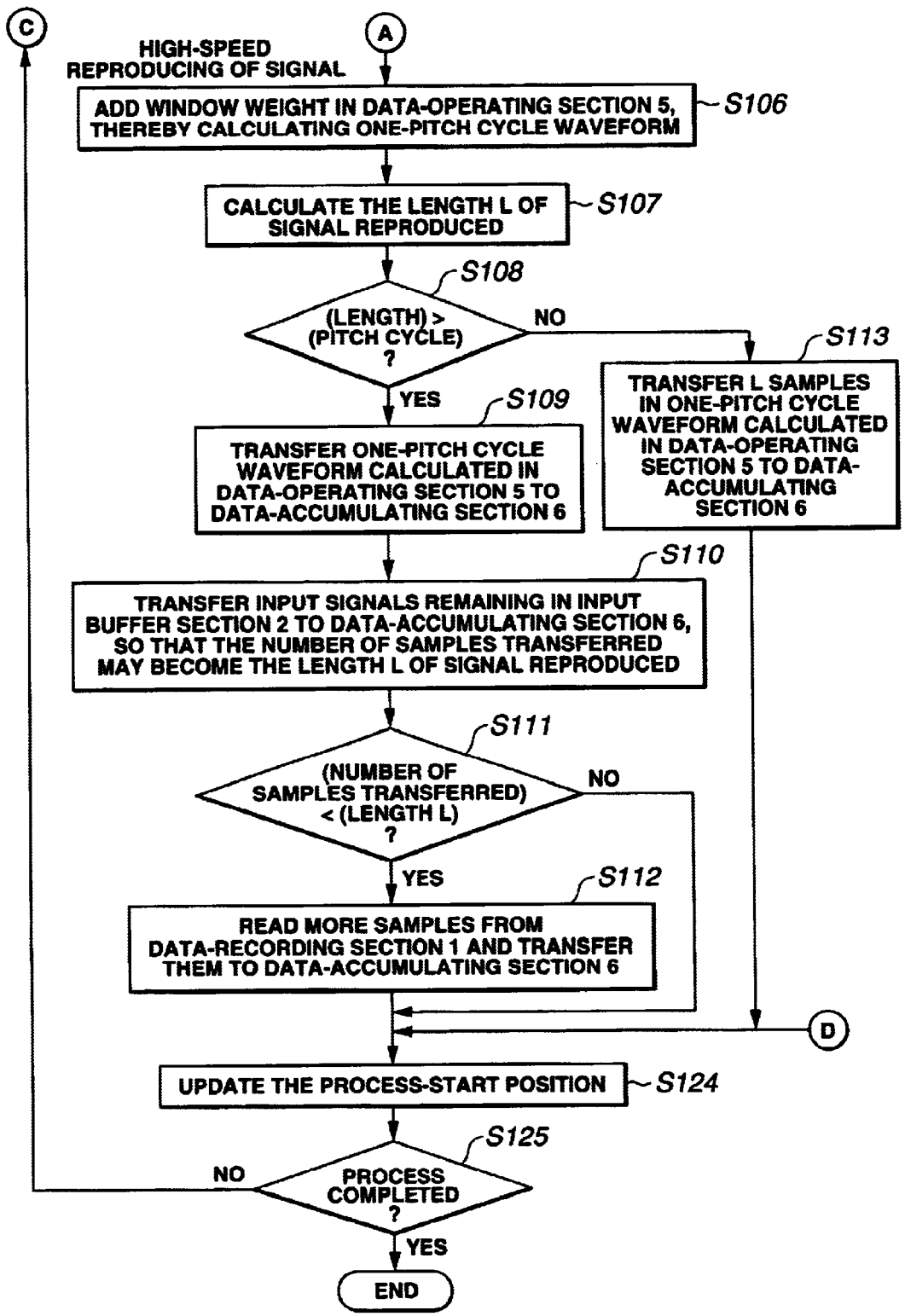
FIG. 11 is the second flowchart explaining the first embodiment of this invention.
Figure 12:
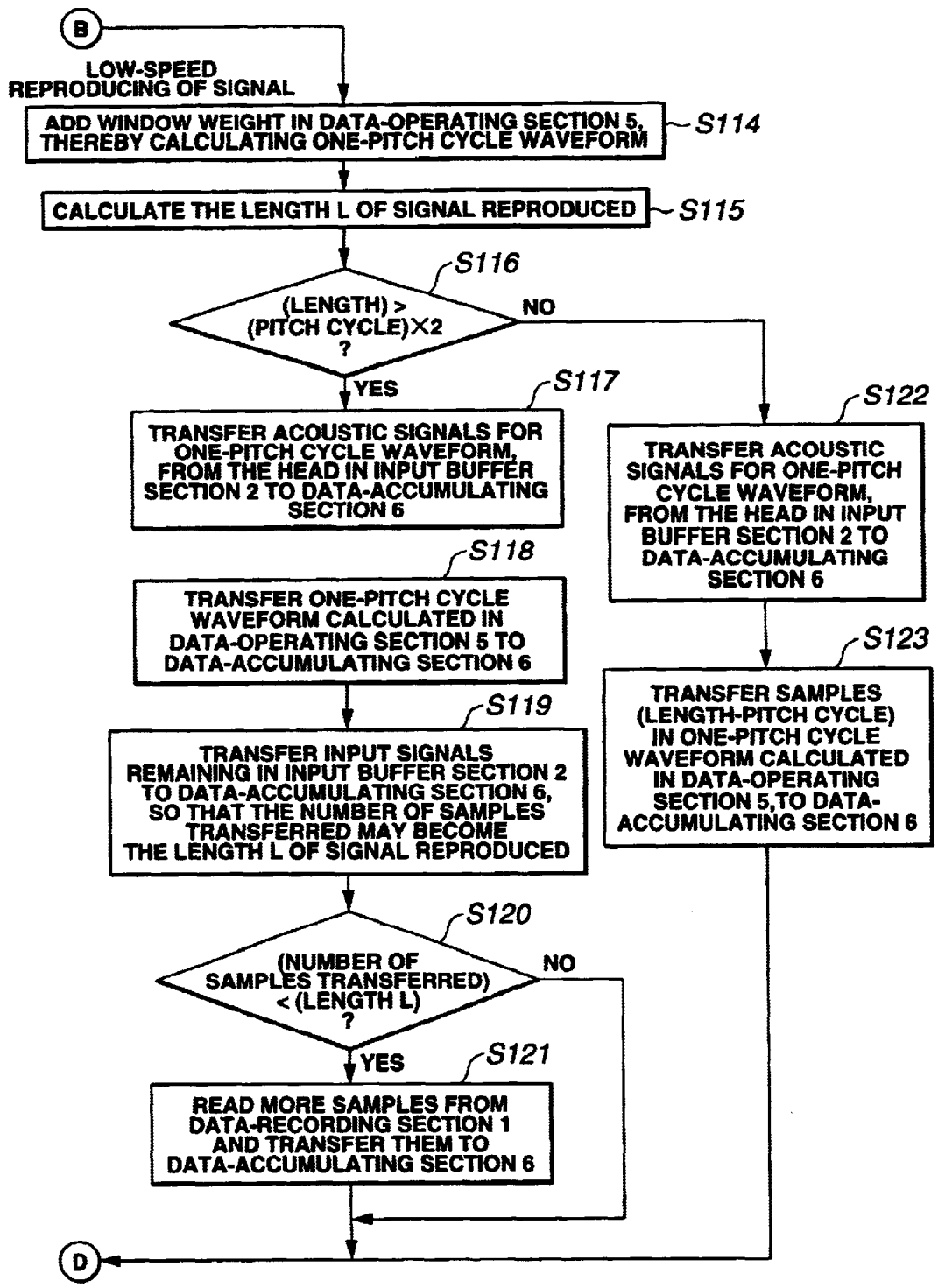
FIG. 12 is the third flowchart explaining the operation of the first embodiment of the invention.

How the reproducing-speed converting apparatus, i.e., the first embodiment described above, operates will be explained in detail, with reference to the flowcharts of FIGS. 10, 11 and 12.

First, in Step S 101, the apparatus is initialized, setting the process-start position at the value of 0. The value of the process-start position in the data-recording section 1 is updated by the process control circuit 4. The process control circuit 4 generates a data-read control signal s7 from the value updated. The control signal s7 is supplied to the data-recording section 1 and controls the reading of the input acoustic signal s1.

In Step S102, the process control section 4 causes the low pass filter 6 to process the input acoustic signal s1, and the decimation section 8 to perform decimation on the signal s1. The input acoustic signal s1 is thereby down-sampled. That part of the signal s1 which lasts for $T'_{max} \times 2$, where T' max is the maximum pitch cycle, is read into the signal buffer section 9.

Figure 13:
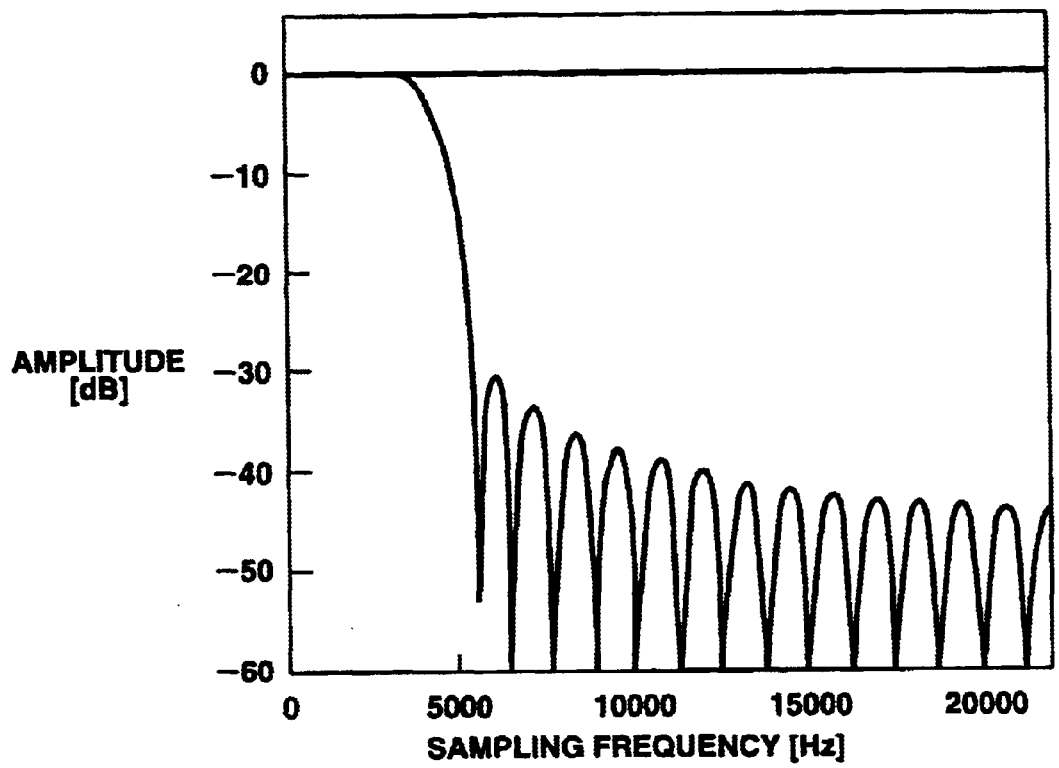
FIG. 13 is a graph illustrating the characteristic of the low pass filter incorporated in the first embodiment of this invention.

Assume that the sampling frequency of the input acoustic signal is 44.1 kHz, that the low pass filter 7 exhibits the characteristic of FIG. 13, and that the decimation section 8 has an decimation-factor constant deci of 4. Then, the input acoustic signal is processed, as will be explained with reference to the timing chart of FIG. 14.

Figure 14:
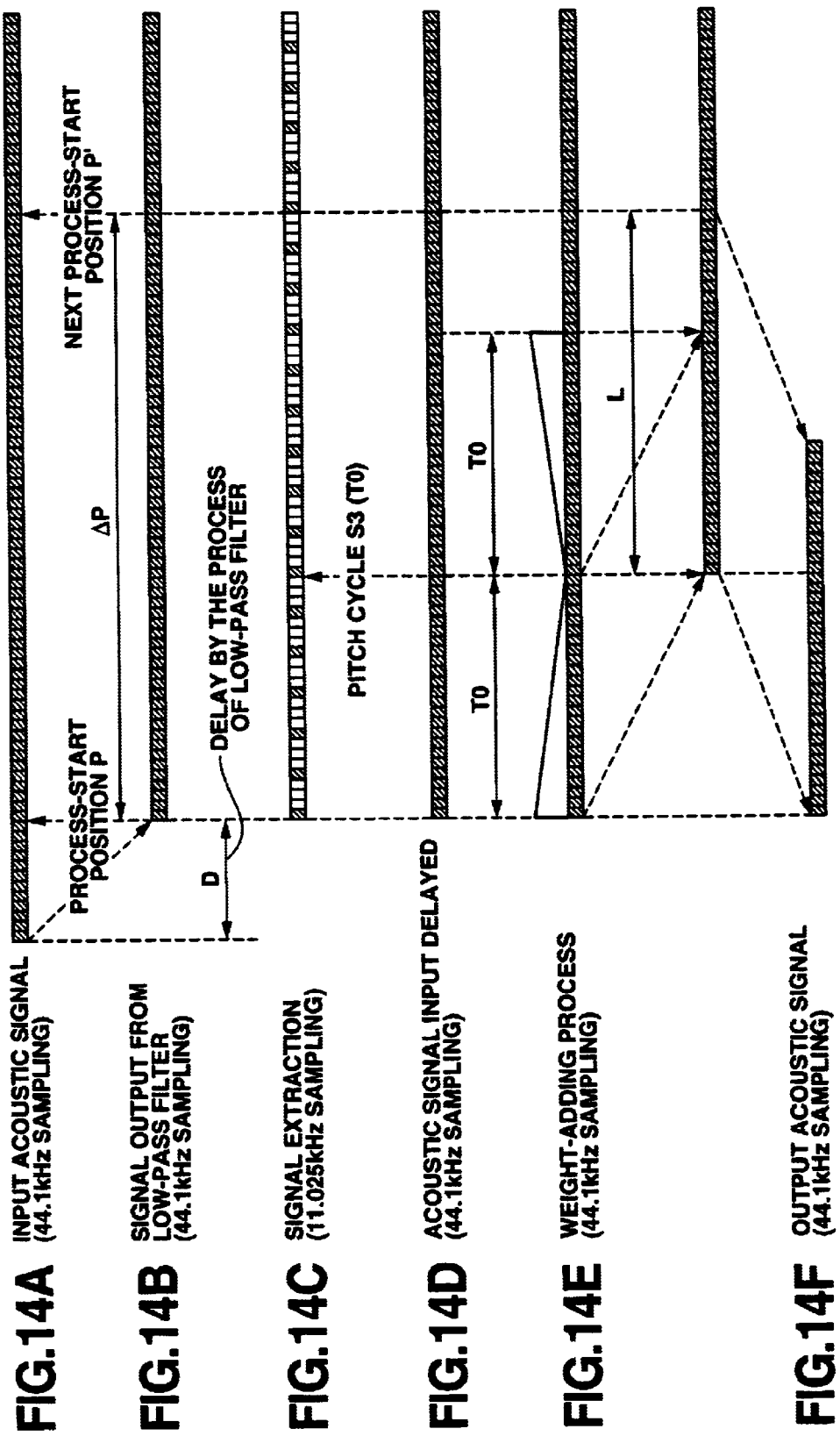
FIG. 14 is a timing chart for explaining the operation of the first embodiment of the present invention

The input acoustic signal (a) of FIG. 14, which has a sampling frequency of 44.1 kHz, is supplied to the low pass filter 7 shown in FIG. 13. The low pass filter 7 suppress the high-band component of the acoustic signal (a), outputting a signal (b) of FIG. 14. The output signal (b) of the low pass filter processing signal is delayed by time D with respect to the input acoustic signal (a). The output signal (b) is supplied to the decimation section 8. The decimation section 8 decimates a fourth of the signal (b), generating an input acoustic signal $x_{deci}(i)$, down-sampled and having a sampling frequency of 11.025 kHz. The $x_{deci}(i)$ is defined by the following equation (6) (see (c) of FIG. 14):

(Equation 6)

$$x_{deci}(i) = x_{lpf}(\text{deci} \times i) \qquad (6)$$

The low pass filter 7 may be of FIR (Finite Impulse Response) type. If so, it suffices to perform low pass filtering on only the sample at the decimation position.

In Step S103, the process control section 4 causes the pitch-calculating section 3 to calculates a pitch cycle s3 from the down-sampled, input acoustic signal s2.

The down-sampled, input acoustic signal has, for example, a pitch cycle T' (sample) that minimizes T the mean distortion d' (T) defined by the following equation (7). On the other hand, the input acoustic signal s1 has, for example, a pitch cycle T0 that is expressed by the following equation (8).

(Equation 7)

$$d'(T) = \frac{1}{T}\sum_{i=0}^{T-1} \{xdeci(i) - xdeci(i+T)\}^2, \; T'_{\min} \le T \le T'_{\max} \qquad (7)$$

(Equation 8)

$$T_0 = \text{deci} \times T'_0 \qquad (8)$$

Assume that the input acoustic signal has a sampling frequency of 44.1 kHz and that down-sampled, input acoustic signal has a sampling frequency of 11.025 kHz. Then, $T_{max}=882$, $T_{min}=178$, $T'_{max}=221$, and $T'_{min}=44$, when pitch frequencies ranging from 50 Hz to 200 Hz are searched for. The down-sampled, input acoustic signal is used to accomplish correlation. Therefore, the amount of data processed to calculate the pitch cycle is much smaller than in the case where the pitch cycle is calculated in the conventional apparatus by using the equation (1).

In Step S104, the process control section 4 reads the input acoustic signal s1 for (max. pitch cycle $T_{max}\times 2$) from the process-start position P into the input buffer section 2 via the delay section 10 that compensates for the delay D the low pass filter 7 applies to the acoustic signal. The input buffer section 2 outputs a signal s4, or signal (d) shown in FIG. 14. The signal s4 is transferred to the data-operating section 5.

In Step S105 it is determined whether the reproducing-speed converting rate R is greater than 1. If the rate R is greater than 1, it indicates that the high-speed reproduction is being carried out. In this case, the process control section 4 goes to Step S106 shown in FIG. 11. If the rate R is not greater than 1, it indicates that the low-speed reproducing is being performed. If this is the case, the process control section 4 goes to Step S114 shown in FIG. 12.

During the high-speed reproduction, the data-operating section 5 adds a window weight (shown in FIG. 10) in Step S106, under the control of the process control section 4. The circuit 5 generates a 1-pitch cycle waveform signal (i.e., operation process signal s5), as is illustrated at (e) in FIG. 14.

Thereafter, in Step S107, the process control section 4 calculates a reproduced-signal length L in accordance with the following equation (9):
(Equation 9)

$$L = deci \times \left\lfloor \frac{1}{deci} \times T_0 \times \frac{1}{R-1} + 0.5 \right\rfloor \quad (9)$$

The right side is multiplied by the decimation-factor constant deci. The brackets, [ ], in the equation (9) means the finding of the greatest integer that does not exceed x. The reproduced-signal length L is a multiple of the decimation-factor constant deci, concerning the position of down-sampling.

Next, in Step S108, the process control section 4 determines whether the reproduced-signal length is longer than the pitch cycle. If YES, that is, if the length is longer than the pitch cycle, the section 4 goes to Step S109. If NO, the section 4 advances to Step S113.

In Step S109, the process control section 4 transfers a one-pitch cycle waveform calculated by the data-operating section 5, to the data-accumulating section 6 through the input buffer section 2.

Then, in Step S110, the process control section 4, in order to equalize the number of samples transferred with the reproduced-signal length L, transfers the remaining input acoustic signals, which have not been transferred to the data-operating section 5, from the input buffer section 2 to the data-accumulating section 6.

In Step S111, the process control section 4 determines whether the number of samples transferred is less than the reproduced-signal length L. If YES, the section 4 advances to Step S112. If NO, the section 4 goes to Step 124.

In Step S112, the process control section 4 reads more acoustic signals from the data-recording section 1 into the input buffer section 2. These acoustic signals are transferred from the input buffer section 2 to the data-accumulating section 6. Then, the section 4 goes to Step S124.

If NO in Step S108, the process control section 4 goes to Step S113. In Step S113, the section 4 transfers to the data-accumulating section 6 the samples contained in the one-pitch cycle waveform calculated by the data-operating section 5. The section 4 then goes to Step S124. Step S124 will be described later.

Figure 10:
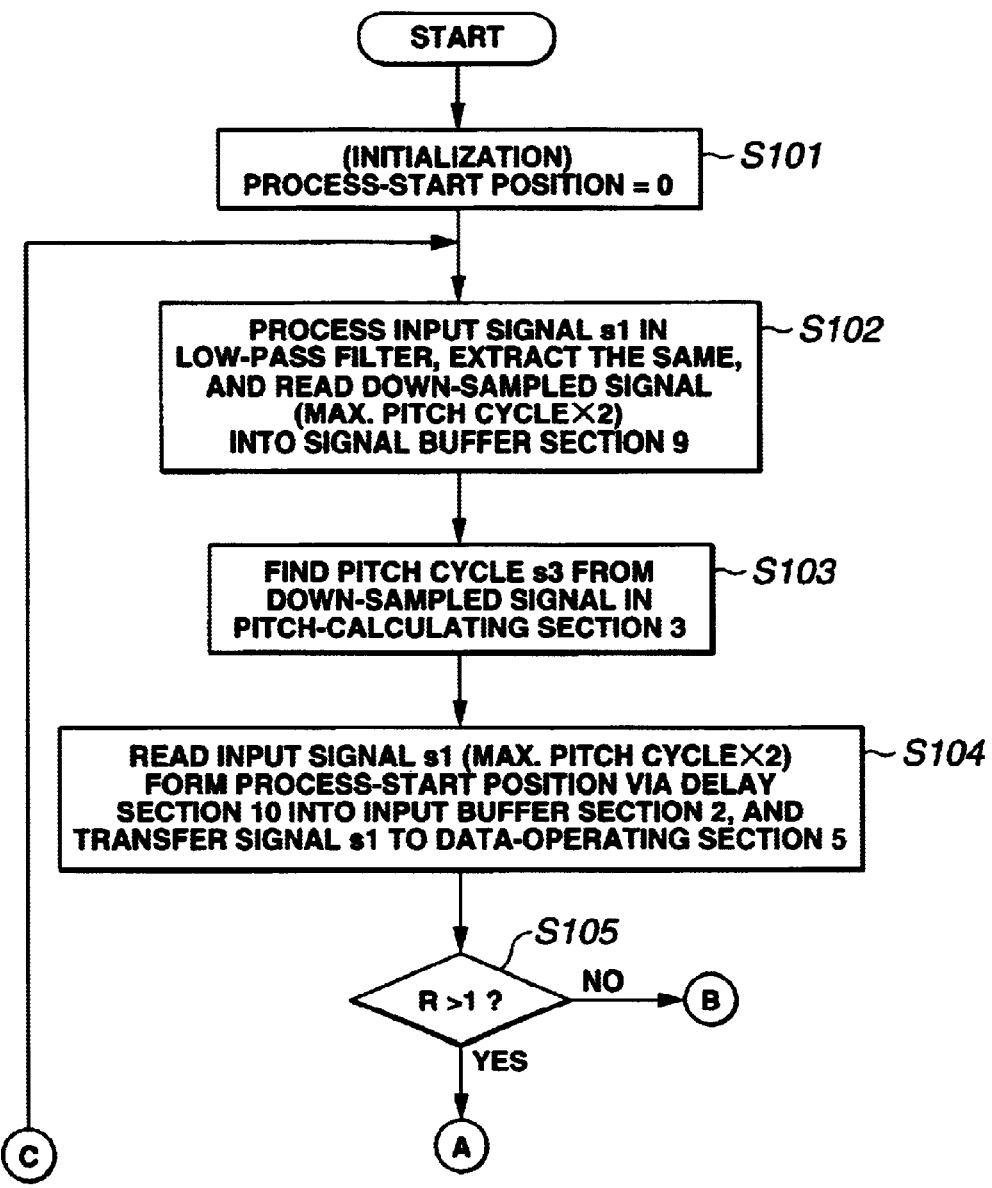
FIG. 10 is the first flowchart explaining the operation of the first embodiment of the invention.

If NO in Step S105 shown in FIG. 10, that is, if the process control section 4 determines that the reproducing-speed converting rate R is not greater than 1, indicating that the low-speed reproducing is being performed. In this case, the section 4 goes to Step S114 shown in FIG. 12. In Step S114, the section 4 causes the data-operating section 5 to add a window weight as illustrated in FIG. 14. The data-operating section 5 generates a 1-pitch cycle waveform signal (i.e., operation process signal s5), as is shown at (e) in FIG. 14.

In Step S115, the length L of the signal reproduced is calculated in accordance with the following equation (10):
(Equation 10)

$$L = deci \times \left\lfloor \frac{1}{deci} \times T_0 \times \frac{1}{1-R} + 0.5 \right\rfloor \quad (10)$$

The right side is multiplied by the decimation-factor constant deci. The brackets, ⌊ ⌋, in the equation (10) means the finding of a greatest integer that does not exceed x. The reproduced-signal length L is a multiple of the decimation-factor constant deci, concerning the position of down-sampling.

In Step S116 it is determined whether the reproduced-signal length is longer than (pitch cycle×2). If YES, the operation advances to Step S117. If NO, the operation goes to Step S122.

In Step S117, the process control section 4 transfers the waveform for the first pitch cycle, from the input buffer section 2 to the data-accumulating section 6.

In Step S118, the process control section 4 transfers the one-pitch cycle waveform calculated in the data-operating section 5, to the data-accumulating section 6.

Then, in Step S119, the process control section 4 transfers the input acoustic signals, which have not been transferred to the section 6 in Step S117, from the input buffer section 2 to the data-accumulating section 6, so that the number of the samples transferred may define the length L of the signal reproduced.

In Step S120, the process control section 4 determines whether the number of the samples transferred is shorter than the length L of the signal reproduced. If YES, the section 4 goes to Step S121. If NO, the section 4 goes to Step S124.

In Step S121, the process control section 4 reads more acoustic signal from the data-recording section 1 into the input buffer section 2 and transfers these samples to the data-accumulating section 6. The section 4 then advances to Step S124.

In Step S122, the process control section 4 transfers the waveform for the first pitch cycle, from the input buffer section 2 to the data-accumulating section 6.

In Step S123, the process control section 4 transfers to the data-accumulating section 6 the samples, i.e., (reproduced-signal length L-pitch cycle T0), which are contained in the one-pitch cycle waveform calculated in the data-operating section 5. Then, the section 4 advances to Step S124.

In Step S124, the process control section 4 updates the next process-start position P' in accordance with the following equation (11):
(Equation 11)

$$P' = P + deci \times \left\lfloor \frac{\Delta P}{deci} + 0.5 \right\rfloor \quad (11)$$

In the equation (11), ΔP is the distance of moving of the process-start position. The distance ΔP is given by the following equation (12):

(Equation 12)

$$\Delta P = T_0 \times \frac{R}{|1-R|} \quad (12)$$

The next process-start position P' is updated so that it may move to the very down-sampling position.

In Step S125 it is determined whether the process has completed or not. If NO, the operation goes to Step S102. If YES, the process is terminated.

The first embodiment of this invention has been described.

The second embodiment of the invention will now be described. The second embodiment is also an apparatus that converts the speed of reproducing digital PCM acoustic signals. However, the second embodiment is designed to perform a frame process, not the process effected in the first embodiment shown in FIG. 9. That is, the second embodiment processes input acoustic signals and output acoustic signals in units each consisting of a prescribed number of signals.

Figure 15:
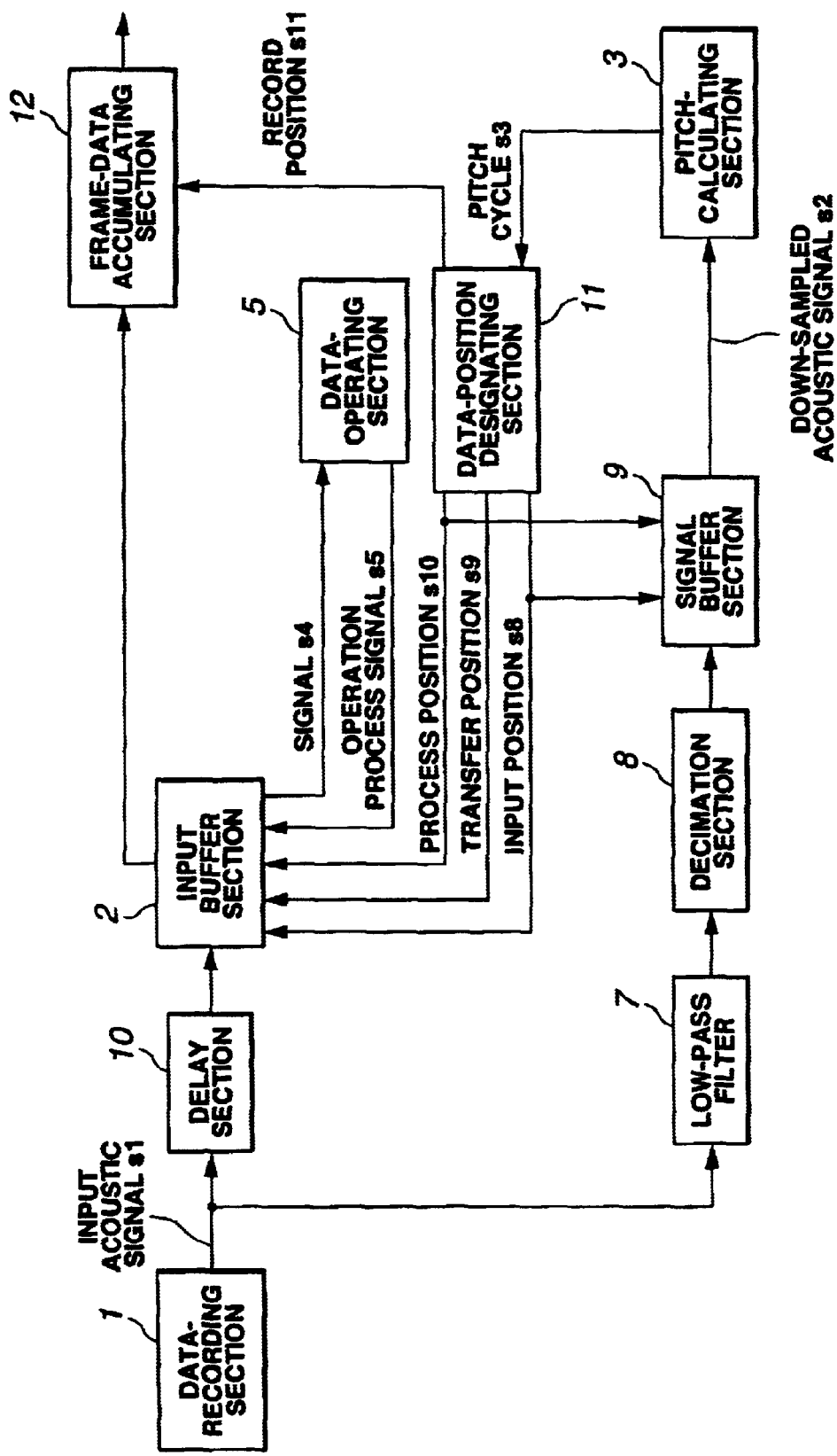
FIG. 15 is a block diagram depicting a reproducing-speed converting apparatus that is the second embodiment of the invention.

FIG. 15 shows the second embodiment, i.e., a reproducing-speed converting apparatus. The apparatus comprises a data-recording section 1, a pitch-calculating section 3, a low-pass filter 7, an decimation section 8, and a signal buffer section 9. The data-recording section 1 records and holds acoustic signals. The low-pass filter 7 suppress the high-band component of each acoustic signal recorded in the data-recording section 1. The decimation section 8 effects an appropriate decimation process on the output signal from the low-pass filter 7. The signal buffer section 9 accumulates the acoustic signals down-sampled by the decimation section 8, in units of frames. The section 3 calculates the pitch cycle of each signal held in the signal buffer section 9.

The reproducing-speed converting apparatus further comprises an input buffer section 2, a data-operating section 5, a delay section 10, a data-position designating section 11, and a frame-data accumulating section 12. The delay section 10 compensates for the delay D the low-pass filter 7 applies to the acoustic signal. The input buffer section 2 accumulates the acoustic signals in units of frames, which have been supplied to it through the delay section 10. The data-operating section 5 calculates similar waveform from the pitch-cycle waveform the pitch-calculating section 3 has calculated. The frame-data accumulating section 12 (an output frame buffer section) accumulates the data in units of frames, which has been calculated by the data-operating section 5. The data-position designating section 11 controls the position where the input buffer section 2 reads acoustic signals, the position where the calculation of the pitch cycle is started in the input buffer section 2, the position where data is transferred to the frame-data accumulating section 12, and the position data is recorded in the frame-data accumulating section 12.

The operation of the reproducing-speed converting apparatus, i.e., the second embodiment of the invention, will be described in brief.

Of the acoustic signals held in the data-recording section 1, the input acoustic signal s1 for an input frame is supplied to the low-pass filter 7. The low-pass filter 7 suppress the high-band component of the acoustic signal s1. The decimation section 8 performs an appropriate down-sampling on the signal output from the low pass-filter 7. The signal output from the section 8 is read into the signal buffer section 9.

The input acoustic signal s1 for the input frame is supplied from the data-recording section 1 to the delay section 10, which compensates for the delay D the low-pass filter 7 applies to the acoustic signal s1. The signal output from the delay section 10 is read into the input buffer section 2.

A down-sampled, input acoustic signal s2 for at most two pitch cycles from the process-start position designated by the data-position designating section 11 is transferred from the signal buffer section 9 to the pitch-calculating section 3. The section 3 calculates a pitch cycle s3.

The data-position designating section 11 generates a signal s4 from the pitch cycle s3 calculated by the pitch-calculating section 3. The signal s4 is transferred from the input buffer section 2 to the data-operating section 5.

The data-operating section 5 calculates a similar waveform from the pitch-cycle waveform, generating an operation process signal s5. The operation process signal s5 is properly over-written in the input buffer section 2.

The output acoustic signal for the output frame length measured from the transfer position designated by the data-position designating section 11 is transferred from the input buffer section 2 to the frame-data accumulating section 12.

The data-position designating section 11 appropriately updates the next process-start position P' in the input buffer section 2.

How the reproducing-speed converting apparatus, i.e., the second embodiment described above, operates will be explained in detail, with reference to the flowcharts of FIGS. 16, 17, 18, 19 and 20.

First, in Step S201, the apparatus is initialized, making the following settings:

Output flag=0

Input flag=1

Input position s8=0

Transfer position s9=0

Process-start position s10=0

Record position s11=0

The values for the input position, process-start position, transfer position and record position are controlled by the data-position designating section 11 shown in FIG. 15.

In Step S202 the data-position designating section 11 determines whether the output flag is 1 or not. If YES, the operation goes to Step S203. If NO, the operation goes to Step S206.

In Step S203, the data-position designating section 11 controls the frame-data accumulating section 12 (i.e., output frame buffer section) shown in FIG. 15. The section 12 outputs the acoustic signals in units of frames. Thereafter, in Step S204, the data-position designating section 11 updates the output flag to "0."

In Step S205, the data-position designating section 11 determines whether the process has completed or not. If YES, the process is terminated. If NO, the operation goes to Step S202.

As described above, the operation goes to Step S206 if the data-position designating section 11 determines in Step S202 that the output flag is not 1. In Step S206 it is determined whether the input flag is 1. If YES in Step S206, the operation goes to Step S207. If NO, the operation goes to Step S210 shown in FIG. 17.

In Step S207, the input acoustic signal s1 for the input-frame length is read from the data-recording section 1 via the delay section 10 into the input buffer section 2, under the control of the data-position designating section 11. More precisely, the signal s1 is read to the position in the input buffer section 2, which has been designated by "input position s8."

Next, in Step S208, the input acoustic signal s1 of the input-frame length is read from the data-recording section 1 under the control of the data-position designating section 11. The signal s1 is supplied to the low-pass filter 7, which performs low-pass filtering on the signal s1. The signal output from the low-pass filter 7 is subjected to down-sampling in the decimation section 8. The signal output from the decimation section 8 is read into the signal buffer section 9.

In Step S209, the data-position designating section 11 updates the input position s8 to (input position s8)+(input frame length).

Figure 17:
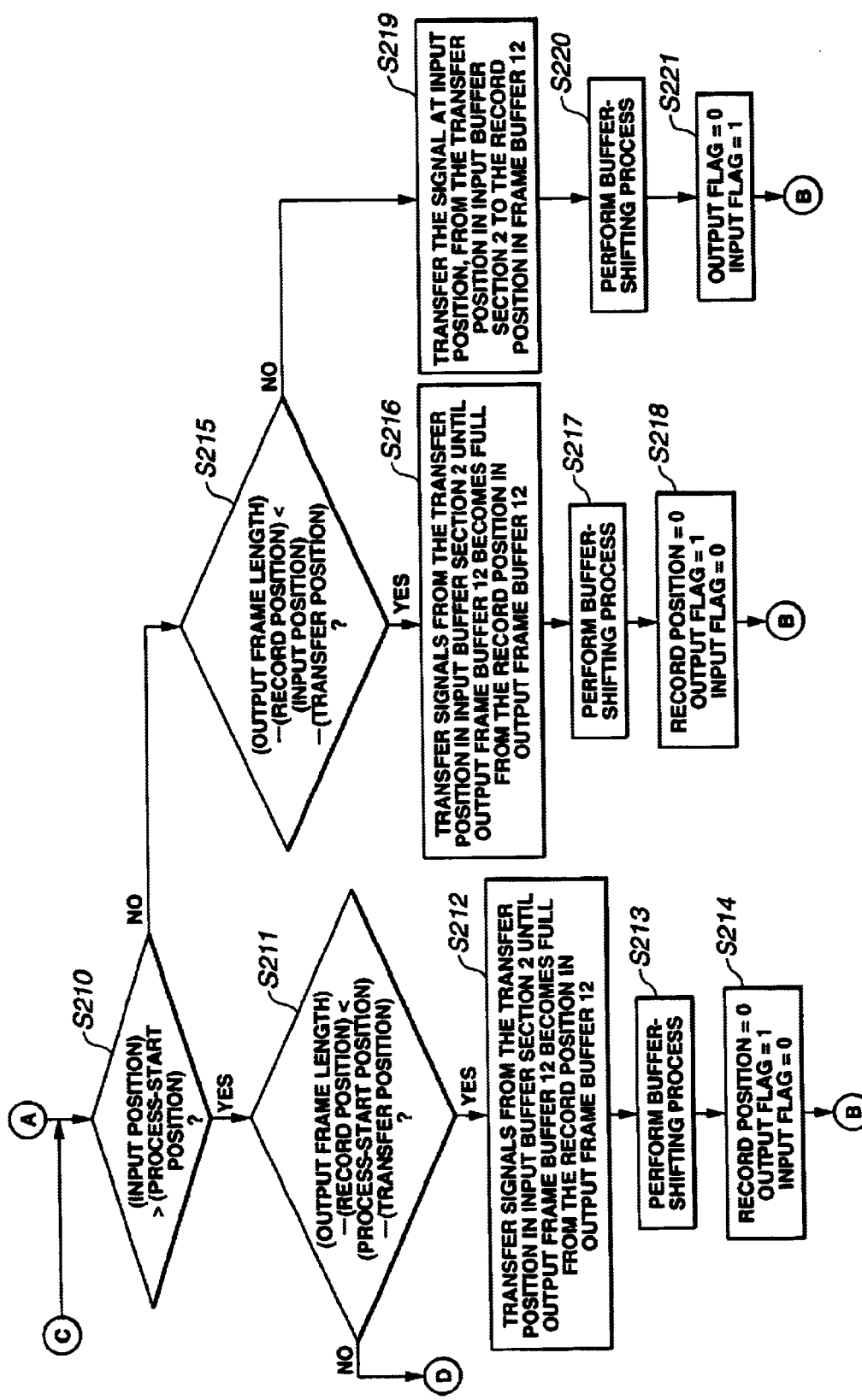
FIG. 17 is the second flowchart explaining the operation of the second embodiment of this invention.

Next, in Step S210 shown in FIG. 17, the data-position designating section 11 determines whether the input position s8 is greater than the process-start position s10. If YES, the operation advances to Step S211. If NO, the operation goes to Step S215.

In Step S211 the data-position designating section 11 determines whether (output frame length)−(recorded position s11) is equal to or less than (process-start position s10)−(transfer position s9). If YES, the operation goes to Step S212. If NO, the operation goes to Step S226.

In Step S212 shown in FIG. 17, signals at the position in the input buffer section 2, designated by "transfer position s9," are transferred to the frame-data accumulating section (output frame buffer section) 12 until the section 12 becomes full from the position in the section 12, which has been designated by "record position s11."

Figure 22:
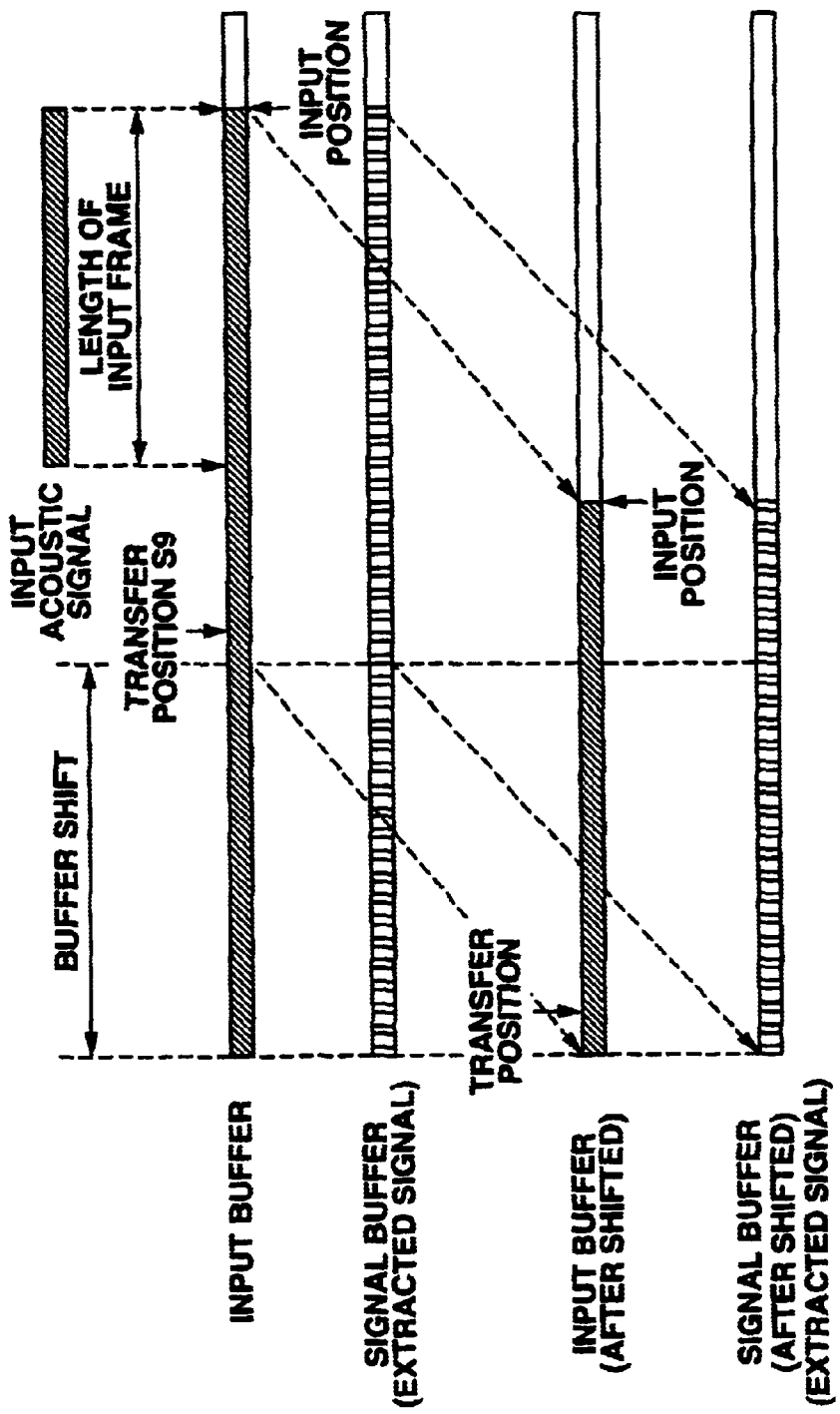
FIG. 22 is a diagram explaining a buffer-shifting process.

In Step S213, a buffer-shifting process is performed on the acoustic signals held in the input buffer section 2 and signal buffer section 9, shifting these signals by a prescribed "buffer-shifting amount," as is illustrated in FIG. 22. The "buffer-shifting amount" is a value than can be divided by an decimation factor constant nearly equal to "input-frame length," without leaving any remainder.

The buffer-shifting process will be described in detail, with reference to FIG. 18 and FIG. 22.

Figure 18:
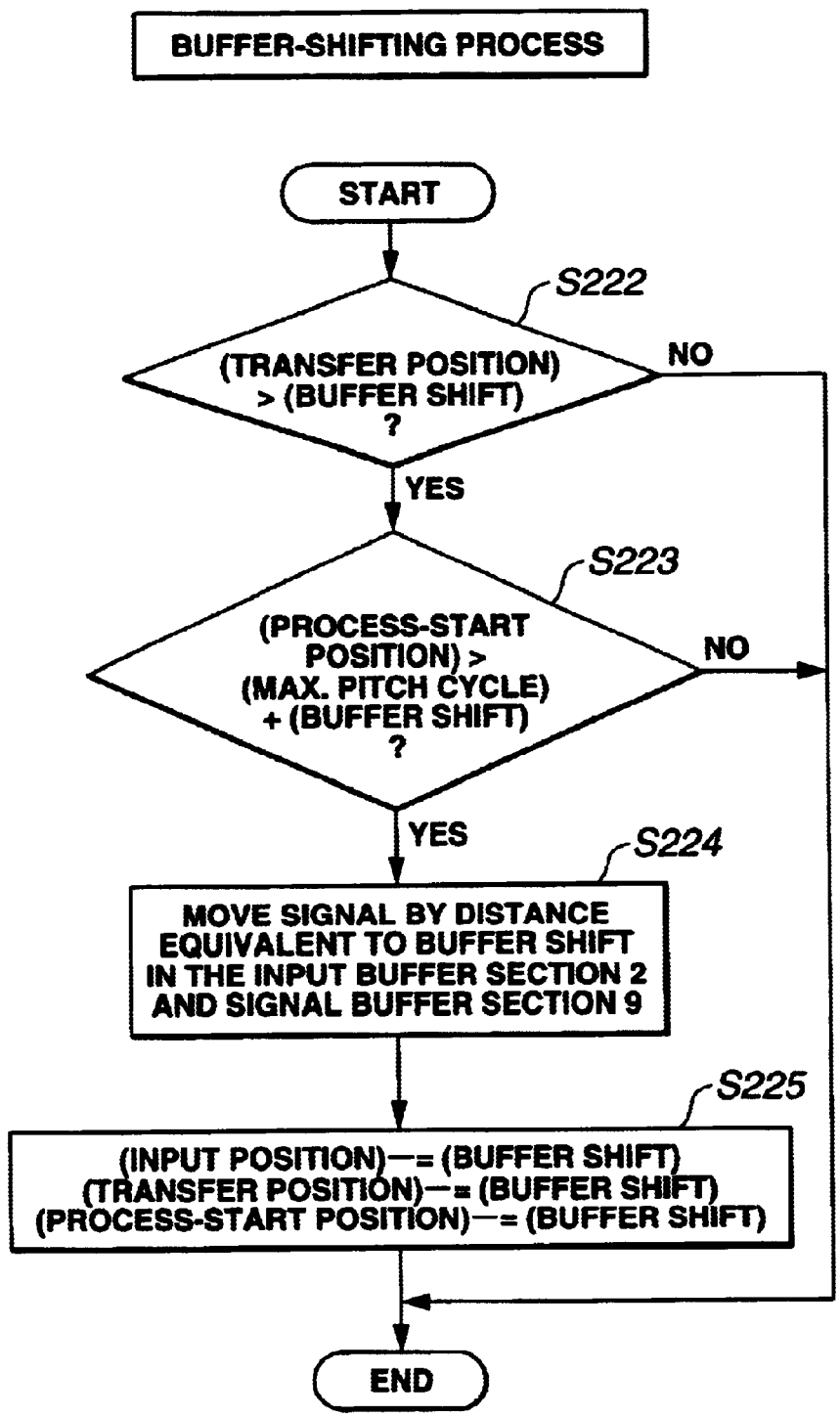
FIG. 18 is the third flowchart explaining the operation of the second embodiment of the invention.

First, in Step S222 shown in FIG. 18, the data-position designating section 11 determines whether the transfer position s9 is equal to or greater than the buffer-shifting amount. If YES, the operation goes to Step S223. If NO, the buffer-shifting process is terminated.

In Step S223, the data-position designating section 11 determines whether the process-start position s10 is greater than (max. pitch cycle)+(buffer-shifting amount). If YES, the operation advances to Step S224. If NO, the buffer-shifting process is terminated.

In Step S224, as shown in FIG. 22, the data-position designating section 11 moves the acoustic signals in the input buffer section 2 by a distance equivalent to the buffer-shifting amount, and the acoustic signals in the signal buffer section 9 by a distance equivalent to (buffer-shifting amount/decimation factor).

In Step S225, the data-position designating section 11 updates the data positions as follows:

Input position s8=input position s8−buffer-sifting amount

Transfer position s9=transfer position s9−buffer-shifting amount

Process-start position s10=Process-start position s10−buffer-shifting amount

The buffer-shifting process has just been described.

With reference to FIG. 17 again, in Step S214, the data-position designating section 11 sets the record position s11 at "0," the output flag at "1," and the input flag at "0." Then, the section 11 advances to Step S202.

In Step S215, the data-position designating section 11 determines whether (input frame length)−(record position s11) is less than (input position s8)−(transfer position s9). If YES, the operation goes to Step S216. If NO, the operation goes to Step S219.

Figure 23:
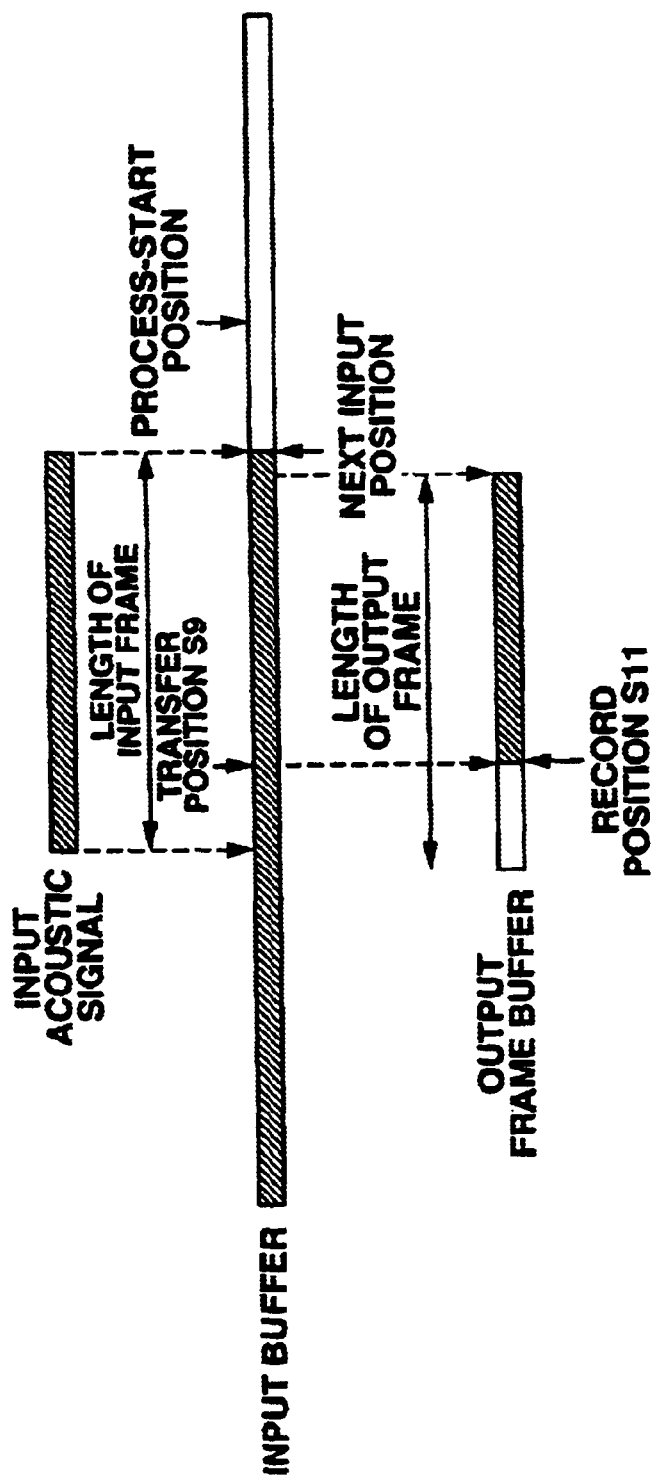
FIG. 23 is a diagram explaining the second example of the reproducing-speed converting process that is realized by processing a frame in the second embodiment of the invention.

In Step S216, as shown in FIG. 23, acoustic signals at the position in the input buffer section 2, designated by "transfer position s9," are transferred to the output frame buffer section 12 until the section 12 becomes full from the position in the section 12, which has been designated by "record position s11." Then, in Step S217, the buffer-shifting process described above is carried out.

Figure 16:
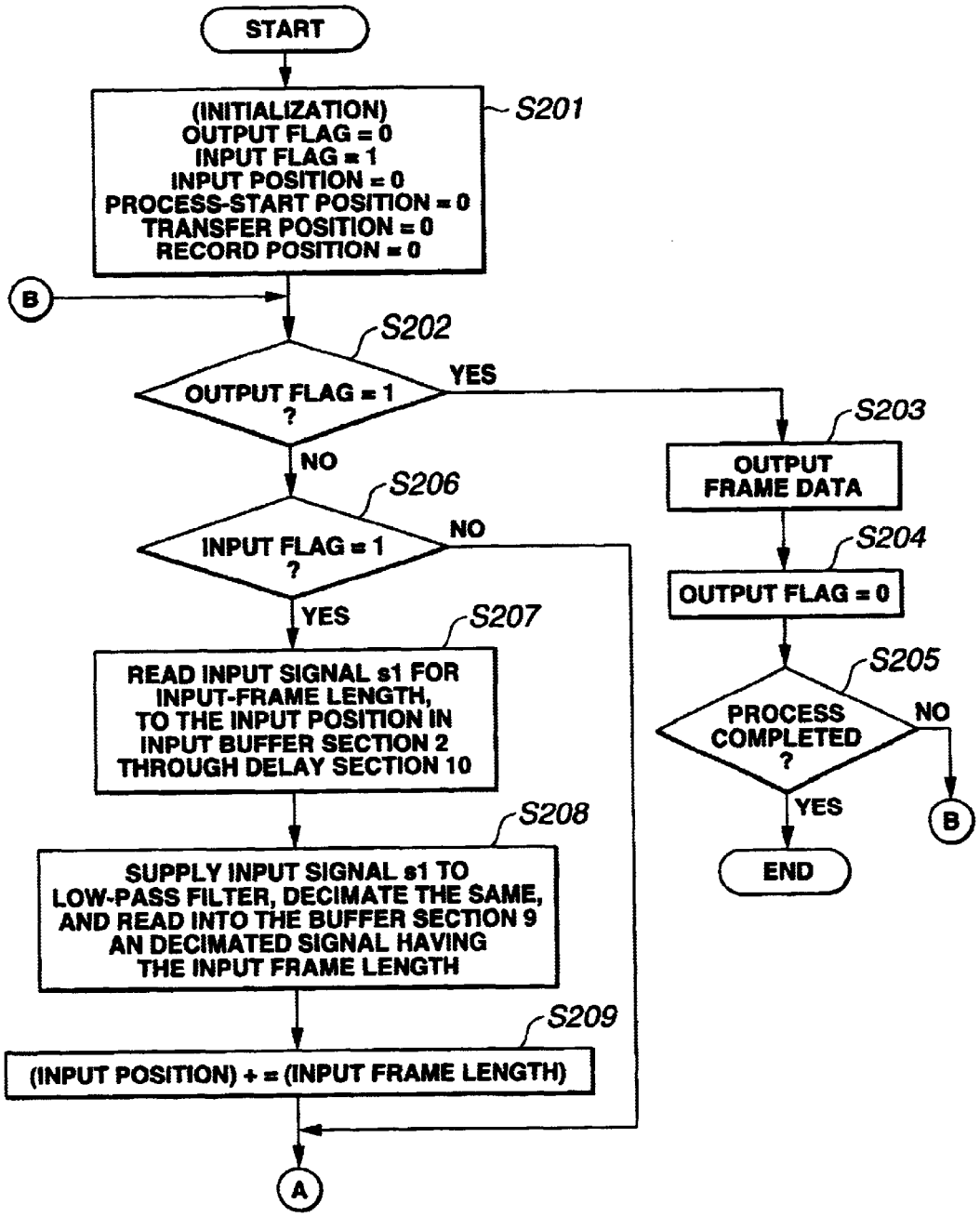
FIG. 16 is the first flowchart explaining the operation of the second embodiment of the invention.

In Step S218, the data-position designating section 11 sets the record position at "0," the output flag at "1," and the input flag at "0." The section 11 advances to Step S202 shown in FIG. 16.

Figure 24:
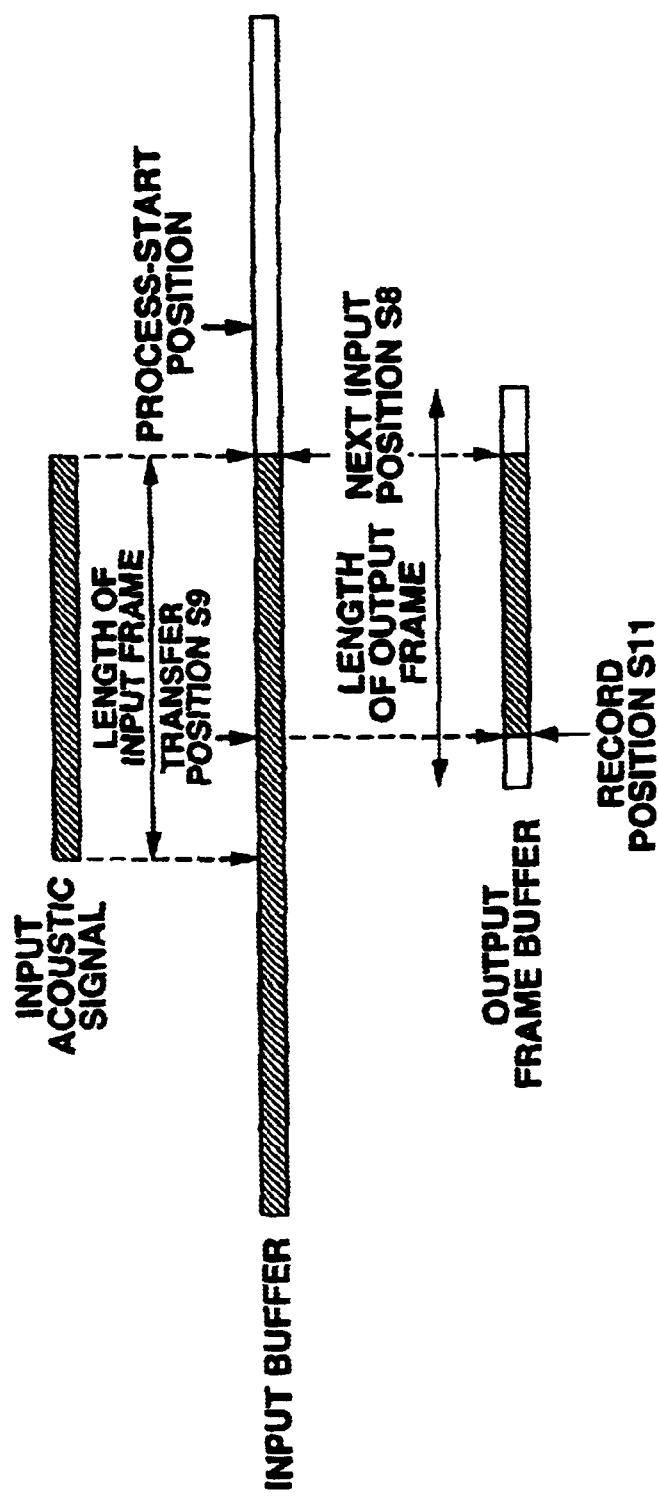
FIG. 24 is a diagram explaining the third example of the reproducing-speed converting process that is effected by processing a frame in the second embodiment of the invention.

As described above, the operation goes to Step S219 if it is NO in Step S215. In Step S219, as shown in FIG. 24, the acoustic signal at the position designated by "input position s8" is transferred from the position in the input buffer section 2, which is designated by "transfer position s9," to the position in the output frame buffer section 12, which is designated by "record position s11." Then, in Step S220, the above-mentioned buffer-shifting process is carried out.

In Step S221, the output flag and the input flag are set at "0" and "1," respectively. The operation goes to Step S202 shown in FIG. 16.

Figure 19:
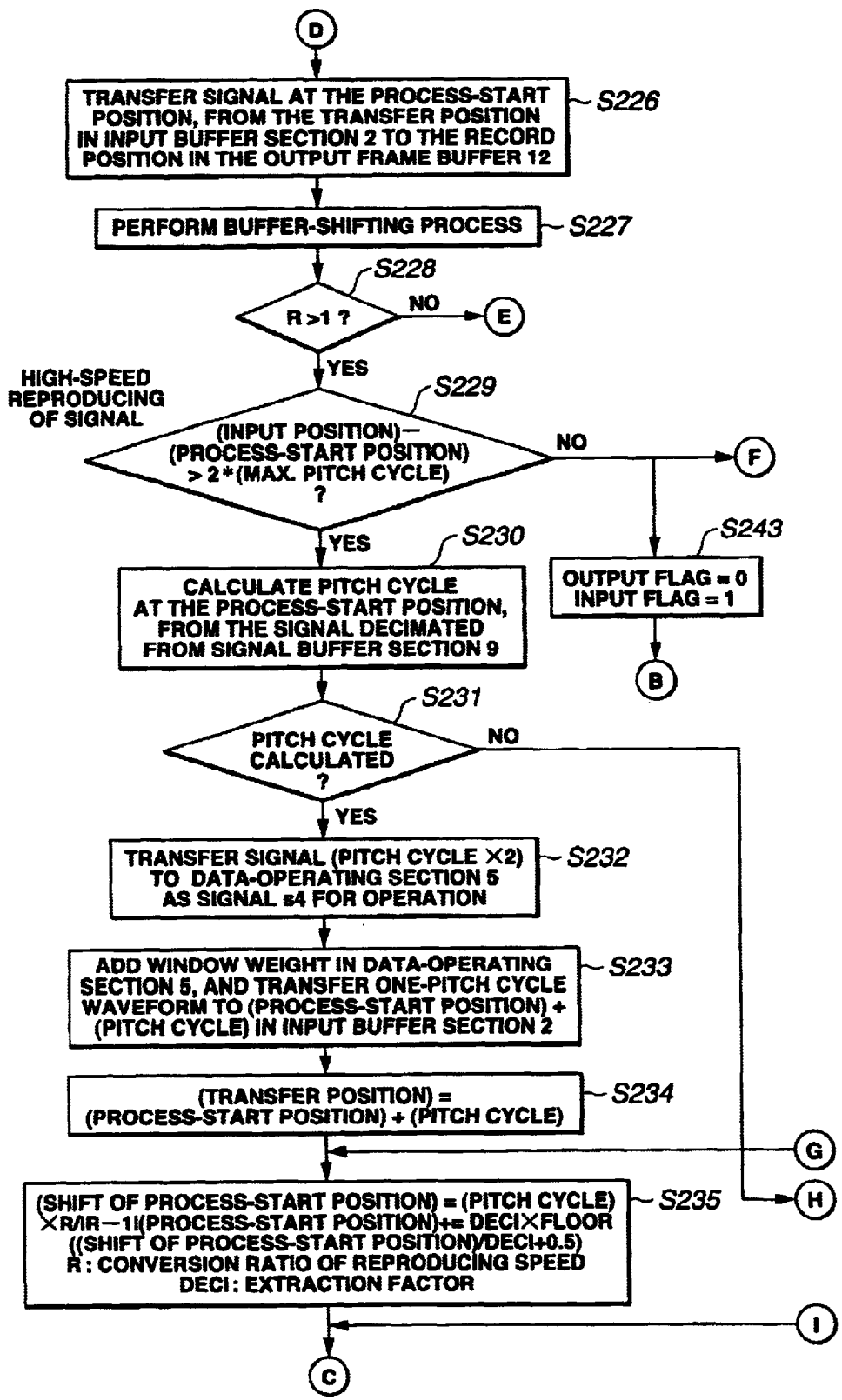
FIG. 19 is the fourth flowchart explaining the operation of the second embodiment of the present invention.
Figure 20:
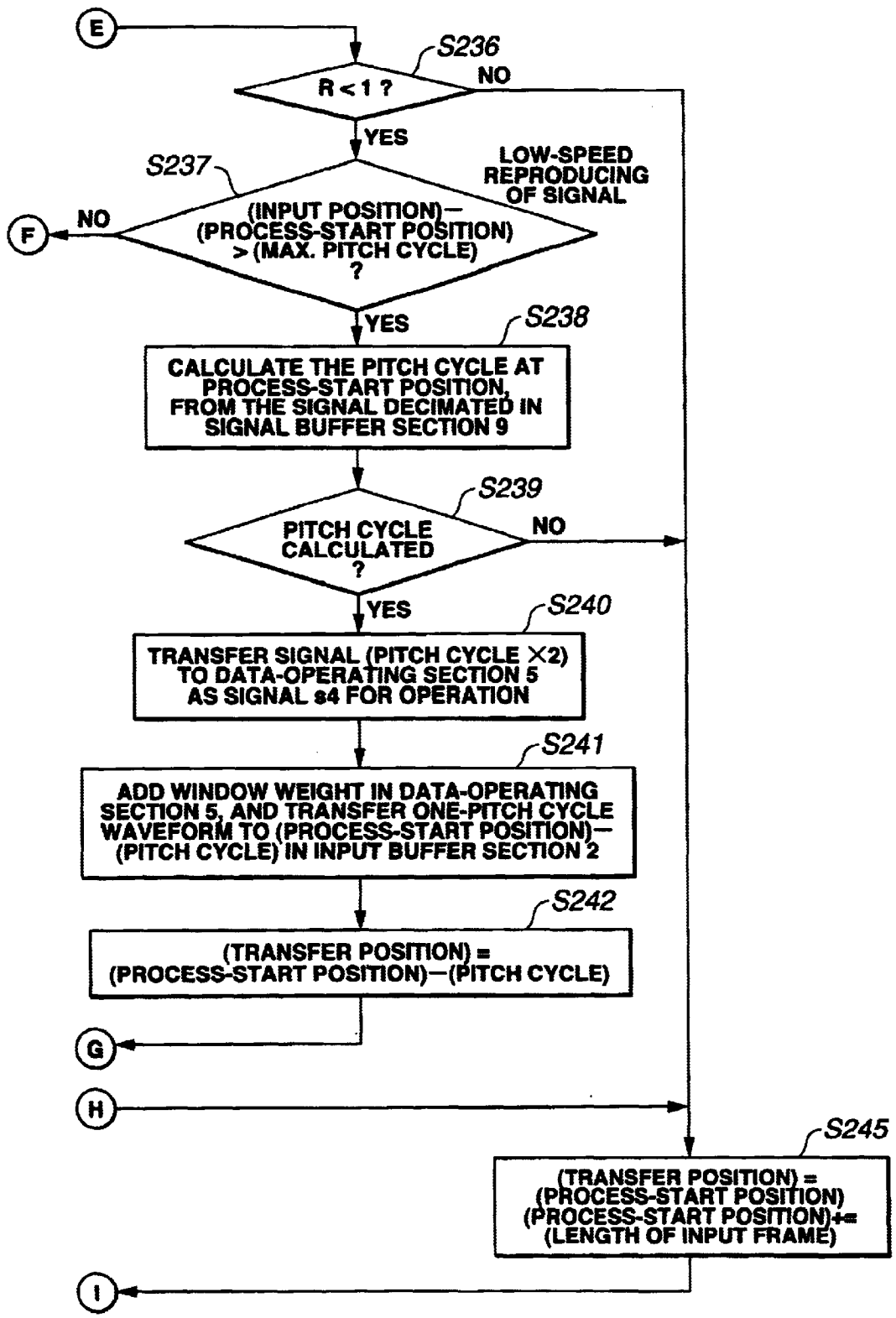
FIG. 20 is the fifth flowchart explaining the operation of the second embodiment of the invention.
Figure 21:
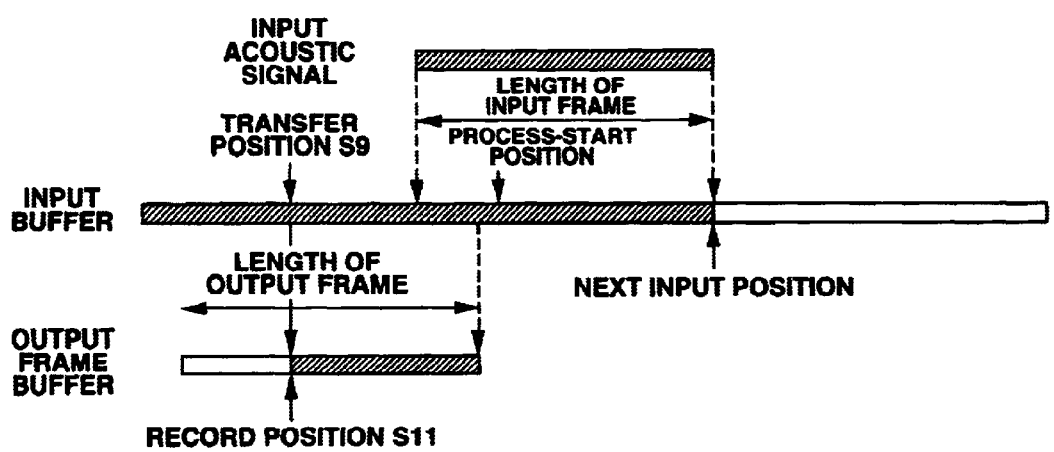
FIG. 21 is a diagram explaining the first example of the reproducing-speed converting process that is accomplished by processing a frame in the second embodiment of the invention.
Figure 25:
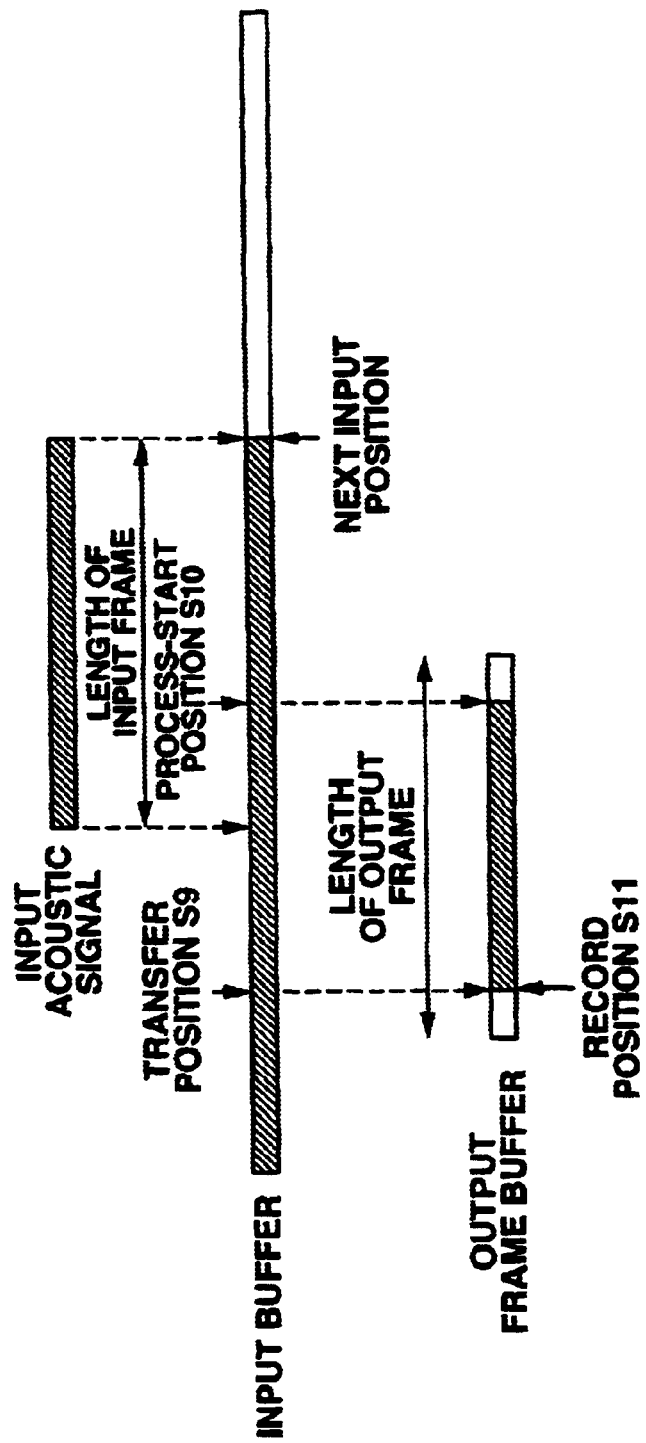
FIG. 25 is a diagram explaining the fourth example of the reproducing-speed converting process that is realized by processing a frame in the second embodiment of the invention.

Next, the data-position designating section 11, in Step S226 shown in FIG. 19, the acoustic signal at the position designated by "process-start position s10" is transferred from the position in the input buffer section 2 shown in FIG. 25, which is designated by "transfer position s9," to the position in the output frame buffer section 12, which is designated by "record position s1."

Figure 26:
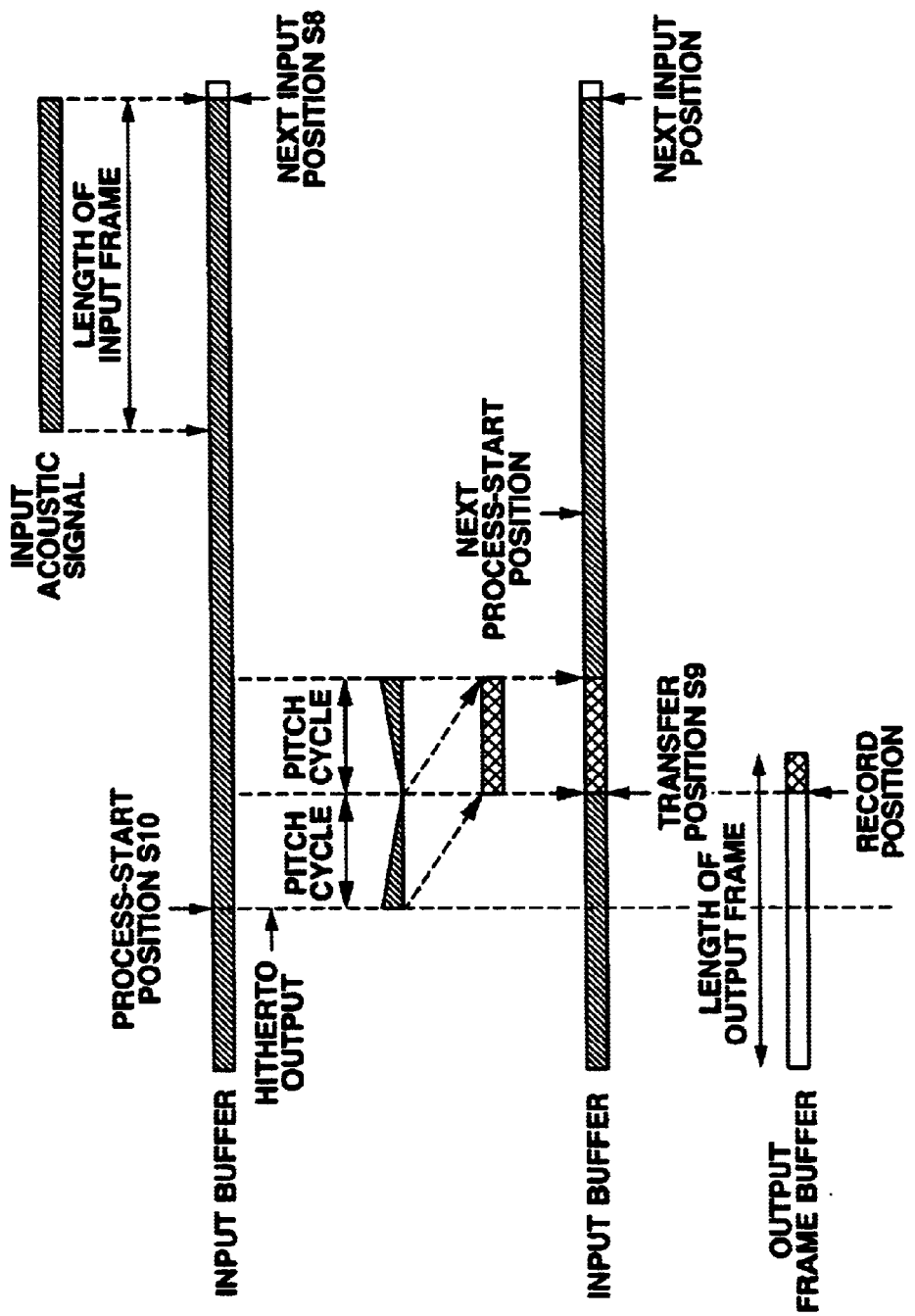
FIG. 26 is a diagram explaining the reproducing-speed converting process that is realized by processing a frame during the high-speed reproduction in the second embodiment of the invention.

In Step S227, the above-mentioned buffer-shifting process is carried out. The operation goes to Step S228, in which it is determined whether the reproducing-speed converting rate R is greater than 1. If the rate R is greater than 1, the operation advances to Steps S229 et seq. that are performed during the high-speed reproduction process. If the rate R is not greater than 1, the operation goes to Step S236 shown in FIG. 20. The processes effected during the high-speed reproduction, i.e., Steps S229 et seq., will be explained with reference to FIG. 26.

In Step S229, the data-position designating section 11 determines whether (input position s8)−(process-start position s10) is greater than 2×(max. pitch cycle). If YES, the section 11 advances to Step S230. If NO, the section 11 goes to Step S243. In Step S243, the data-position designating section 11 sets the output flag and the input flag at "0" and "1," respectively. Then, the section 11 goes to Step S202 shown in FIG. 16.

Next, in Step S230, the pitch-calculating section 3 calculates the pitch cycle at the position designated by "process-start position s10," from the acoustic signal extracted from the signal buffer section 9 under the control of the data-position designating section 11. For example, the section 3 calculates a pitch cycle T (=T′0) that will minimize the mean distortion d′(T) defined by the following equation (13), for the acoustic signal $x_{deci}(i)$ ($0 \leq i \leq 2 \times T'_{max}$) held in the signal buffer section 9, at the position designated by "process-start position s10." Then, the section 3 obtains the pitch cycle T0 in accordance with the following equation (14).

(Equation 13)

$$d'(T) = \frac{1}{T}\sum_{i=0}^{T-1}\{x_{deci}(i) - x_{deci}(i+T)\}^2, \ T'_{min} \leq T \leq T'_{max} \quad (13)$$

(Equation 14)

$$T_0 = deci \times T''_0 \quad (14)$$

In Step S231, the data-position designating section 11 determines whether the pitch cycle calculated in Step S230 is valid or not. If the pitch cycle is found valid, the operation goes to Step S232. If the pitch cycle is found not valid, the operation advances to Step S245 shown in FIG. 20.

In Step S232, the data-position designating section 11 transfers the acoustic signal for two pitch cycles, as operating-process signal s4, from the input buffer section 2 to the data-operating section 5.

In Step S233, the data-position designating section 11 controls the data-operating section 5. The section 5 adds a window weight to the signal s4, generating a waveform for one pitch cycle. The waveform thus generated is transferred to the position in the input buffer section 2, which is designated by (process-start position s10)+(pitch cycle).

In Step S234, the transfer position s9 is updated to (process-start position)+(pitch cycle). The operation then goes to Step S235.

If it is determined in Step S228 that the reproducing-speed converting rate R is greater than 1 and if it is determined in Step S236 (FIG. 20) that the rate R is less than 1, the operation advances to process of the low-speed reproduction (Step S237 et seq.). Otherwise, the operation goes to Step S245.

In Step S237 the data-position designating section 11 may determine that (input position s8)−(process-start position s10) is greater than the maximum pitch cycle. If so, the section 11 goes to Step S238. If NO, the section 11 advances to Step S243 shown in FIG. 19. In Step S243, the section 11 sets the output flag and the input flag at "0" and "1," respectively, and goes to Steps S202.

In Step S238, the pitch cycle at the position designated by "process-start position s10" is calculated from the acoustic signal extracted in the signal buffer section 9. For example, there is calculated a pitch cycle T (=T'0) that will minimize the mean distortion d'(T) defined by the following equation (15), for the acoustic signal $x_{deci}(i)$ ($0 \leq i \leq 2 \times T'_{max}$) held in the signal buffer section 9, at the position designated by "process-start position s10." Then, the pitch cycle T0 is obtained in accordance with the following equation (16). In the equation (16), deci is an decimation factor constant.

(Equation 15)

$$d'(T) = \frac{1}{T}\sum_{i=0}^{T-1}\{x_{deci}(i) - x_{deci}(i+T)\}^2, \ T'_{min} \leq T \leq T'_{max} \quad (15)$$

(Equation 16)

$$T_0 = deci \times T'_0 \quad (16)$$

If it is determined in Step S239 that the pitch cycle calculated in Step S238 is valid, the operation advances to Step S240. Otherwise, the operation goes to Step S245.

In Step S240, the acoustic signal for two pitch cycle, which is held in the input buffer section 2, is transferred as signal s4 to the data-operating section 5.

Figure 27:
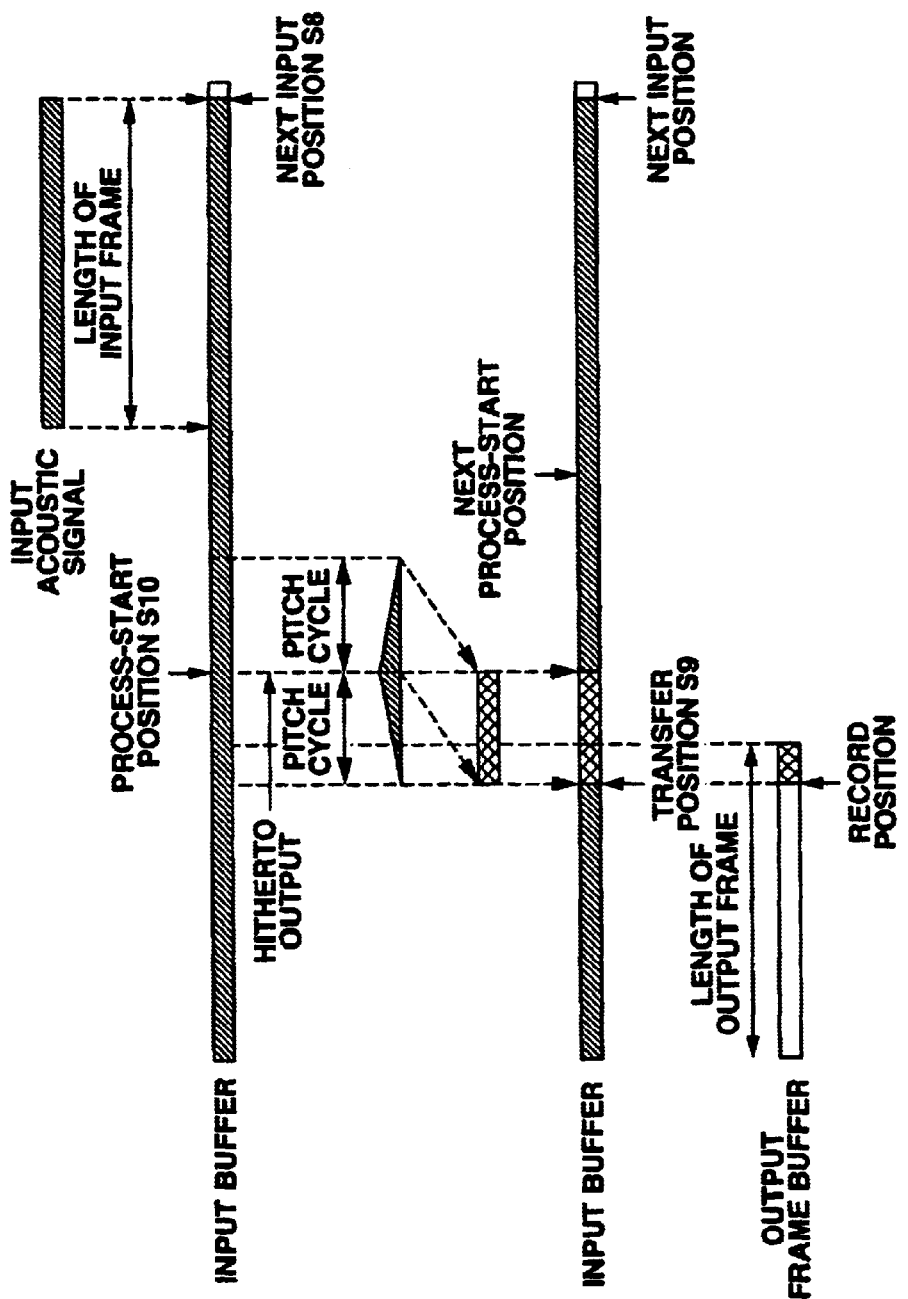
FIG. 27 is a diagram explaining the reproducing-speed converting process that is realized by processing a frame during the low-speed reproduction in the second embodiment of the invention.

In Step S241, the data-operating section 5 adds a window weight to the signal s4, generating a waveform for one pitch cycle. The waveform thus generated is transferred to the position in the input buffer section 2, which is designated by (process-start position s10)−(pitch cycle) (see FIG. 27).

In Step S242, "transfer position s9" is updated as follows:

(Transfer position s9)=(process-start position s10)−(pitch cycle)

The operation returns to Step S235 shown in FIG. 19. In Step S235, "process-start position s10" is updated as indicated by the following equation (17). Then, the operation advances to Step S210.

(Equation 17)

process-start position s10=process-start position s10

$$+ deci \times \left\lfloor \frac{\Delta P}{deci} + 0.5 \right\rfloor \quad (17)$$

The value x in the brackets $\lfloor \ \rfloor$ multiplied by deci in the second term on the right side, is a greatest integer that does not exceed x (=ΔP/deci+0.5), where is ΔP is a distance the process-start position moves, said distance is given by the following equation (18):

(Equation 18)

$$\Delta P = T_0 \times \frac{R}{|1-R|}, \quad (18)$$

In Step S245, "transfer position s9" and "process-start position s10" are updated as follows:

(Transfer position s9)=(process-start position s10)

(Process-start position s10)=(process-start position s10)+ (input frame length)

Then, the operation goes to Step S210.

Figure 28:
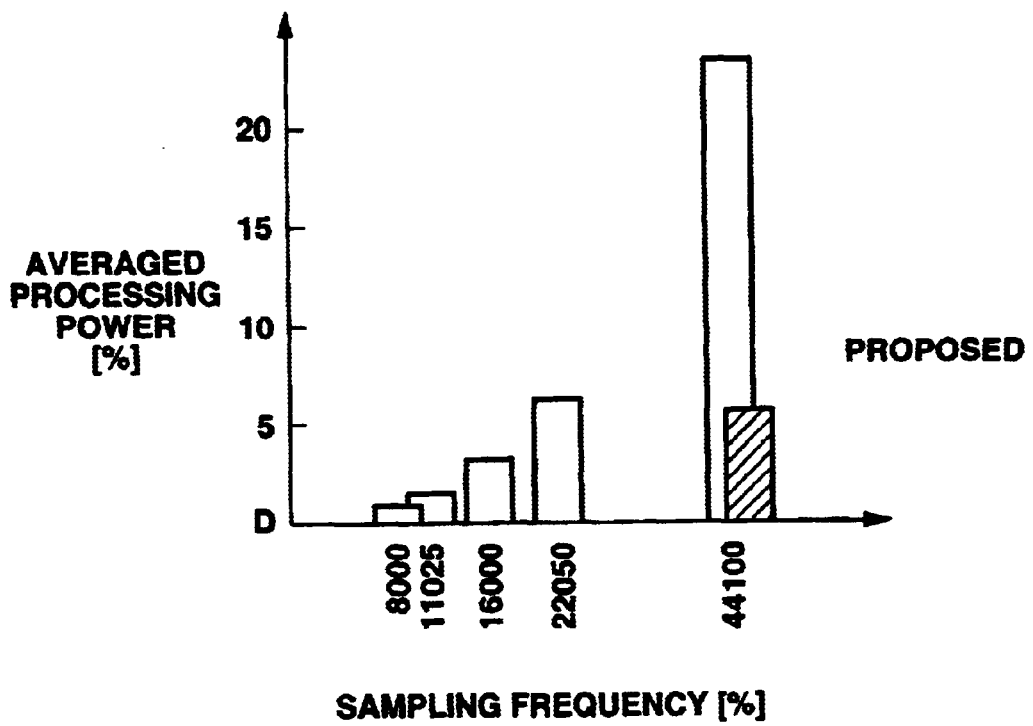
FIG. 28 is a graph illustrating the relation between the sampling frequency and the amount of data processed, for demonstrating the advantages of the embodiments of the present invention.

The advantage of the embodiments of this invention, described above, will be described with reference to FIG. 28. FIG. 28 shows the relation the sampling frequency and the amount of data processed have in the conventional system, and also the relation the frequency and the data amount have in the reproducing-speed converting apparatus of the invention when the sampling frequency is 44100 Hz. (In FIG. 28, the shaded bar "proposed" pertains to the present invention.) As shown in FIG. 28, the amount of data process in the system according to the invention is about 25% of the amount of data processed in the conventional system. The present invention achieves this advantage, because the pitch cycle is calculated from an acoustic signal that has been subjected to low-pass filtering and decimation.

What is claimed is:

1. An apparatus for converting an acoustic-signal reproducing speed, comprising:

recording means for recording and holding acoustic signals;

decimation means for performing a decimation process on the acoustic signals recorded in the recording means;

first accumulating means for accumulating acoustic signals down-sampled by the decimation means;

pitch-calculating means for calculating a pitch cycle of the acoustic signals accumulated in the first accumulating means;

second accumulating means for accumulating the acoustic signals recorded in the recording means;

operation means for calculating a waveform similar to a waveform of the pitch cycle calculated by the pitch-calculating means;

third accumulating means for accumulating data representing the similar waveform calculated by the operation means; and control means for controlling reading of data into the second accumulating means, the calculation performed in the operation means, and transfer of data to the third accumulating means.

2. The apparatus according to claim 1, which further comprises:

low-pass filter means for suppressing a high-band component of each signal recorded in the recording means, wherein the decimation means performs the decimation process on an output signal of the low-pass filter means.

3. The apparatus according to claim 2, which further comprises:

delay means for compensating for a delay in the low-pass filter means, wherein the control means supplies acoustic signals having a length of a predetermined number of pitch cycles from a process-start position into the second accumulating means through the delay means.

4. The apparatus according to claim 1, wherein the operation means calculates the similar waveform by a weight-adding process using weight-window data.

5. The apparatus according to claim 4, wherein the control means changes the weight-adding process in accordance with a reproducing-speed converting rate.

6. The apparatus according to claim 1, wherein the control means calculates a process-start position and a reproduced-signal length on the basis of a decimation rate in accordance with a reproducing-speed converting rate.

7. The apparatus according to claim 6, wherein the control means compares the reproduced-signal length with the pitch cycle of the similar waveform calculated by the operation means, and data representing the similar waveform is changed in accordance with a result of said comparison.

8. A method of converting an acoustic-signal reproducing speed, compromising:

a decimation step of performing a decimation process on acoustic signals recorded in recording means;

a first input-output step of inputting and outputting acoustic signals down-sampled in the decimation step, into and from a first accumulating means;

a pitch-calculating step of calculating a pitch cycle of the signals accumulated in the first accumulating means;

a second input-output step of inputting and outputting the acoustic signals recorded in the recording means, into and from a second accumulating means;

an operation step of calculating a similar waveform similar to a pitch waveform of the pitch cycle calculated in the pitch-calculating step; and a third input-output step of inputting and outputting data representing the similar waveform calculated in the pitch-calculating step, into and from a third accumulating means.

9. An apparatus for converting an acoustic-signal reproducing speed, comprising;

recording means for recording and holding acoustic signals;

decimation means for performing a decimation process on the acoustic signals recorded in the recording means;

first accumulating means for accumulating, in units of frames, acoustic signals down-sampled by the decimation means;

pitch-calculating means for calculating a pitch cycle of the acoustic signals accumulated in the first accumulating means;

second accumulating means for accumulating, in units of frames, the acoustic signals recorded in the recording means;

operation means for calculating a similar waveform similar to a waveform of the pitch cycle calculated by the pitch-calculating means;

third accumulating means for accumulating, in units of frames, data representing the similar waveform calculated by the operation means; and data-position designating means for controlling a position in the second accumulating means to which acoustic signals are read, a position in the second accumulating means at which the calculation of the pitch cycle is started, a position in the third accumulating means to which the data representing the similar waveform is transferred, and a position in the third accumulating means at which the data representing the similar waveform is recorded.

10. The apparatus according to claim 9, which further comprises:

low-pass filter means for suppressing a high-band component of each acoustic signal recorded in the recording means;

wherein the decimation means performs the decimation process or an output signal of the low pass filter means.

11. The apparatus according to claim 10, which further comprises:

delay means for compensating for a delay in the low-pass filter means, wherein the control means supplies acoustic signals having a length of a predetermined number of pitch cycles from a process-start position into the second accumulating means through the delay means.

12. The apparatus according to claim 9, wherein the operation means calculates the similar waveform by a weight-adding process using weight-window data.

13. The apparatus according to claim 12, wherein the data-position designating means changes the weight-adding process in accordance with a reproducing-speed converting rate.

14. A method of converting an acoustic-signal reproducing speed, comprising:

a decimation step of performing a decimation process on acoustic signals recorded in recording means;

a first input-output step of inputting and outputting, in units of frames, acoustic signals down-sampled in the decimation step, into and from a first accumulating means;

a pitch-calculating step of calculating a pitch cycle of the signals accumulated in the first accumulating means;

a second input-output step of inputting and outputting, in units of frames, the acoustic signals recorded in the recording means, into and from a second accumulating means;

an operation step of calculating a similar waveform similar to a pitch waveform of the pitch cycle calculated in the pitch-calculating step; and a third input-output step of inputting and outputting data representing the similar waveform calculated in the pitch-calculating step, into and from a third accumulating means.

* * * * *